(12) United States Patent
Chiba

(10) Patent No.: US 7,586,642 B2
(45) Date of Patent: Sep. 8, 2009

(54) COLOR-SPACE TRANSFORMATION-MATRIX CALCULATING SYSTEM AND CALCULATING METHOD

(75) Inventor: Toru Chiba, Tokyo (JP)

(73) Assignee: Hoya Corporation, Tokyo (JP)

( * ) Notice: Subject to any disclaimer, the term of this patent is extended or adjusted under 35 U.S.C. 154(b) by 917 days.

(21) Appl. No.: 10/898,177

(22) Filed: Jul. 26, 2004

(65) Prior Publication Data

US 2005/0018226 A1 Jan. 27, 2005

(30) Foreign Application Priority Data

Jul. 25, 2003 (JP) ............................ P2003-201668
Jul. 25, 2003 (JP) ............................ P2003-201792

(51) Int. Cl.
*G06F 15/00* (2006.01)
*H04N 1/60* (2006.01)
*G06F 3/08* (2006.01)

(52) U.S. Cl. ......................................... 358/1.9; 358/518
(58) Field of Classification Search ......... 358/1.9–3.32, 358/518; 382/167
See application file for complete search history.

(56) References Cited

U.S. PATENT DOCUMENTS

| | | | |
|---|---|---|---|
| 5,608,549 A | 3/1997 | Usami | |
| 6,278,533 B1 | 8/2001 | Takemoto | |
| 6,421,141 B2 | 7/2002 | Nishikawa | |
| 6,668,079 B2 | 12/2003 | Takemoto | |
| 6,823,083 B1 * | 11/2004 | Watanabe et al. | 382/167 |
| 2003/0081832 A1 * | 5/2003 | Arazaki | 382/167 |
| 2003/0164927 A1 * | 9/2003 | Tsukada | 353/31 |

FOREIGN PATENT DOCUMENTS

| | | |
|---|---|---|
| JP | 5-122511 | 5/1993 |
| JP | 5-244403 | 9/1993 |
| JP | 7-177364 | 7/1995 |
| JP | 7-274019 | 10/1995 |
| JP | 8-275007 | 10/1996 |
| JP | 9-009656 | 1/1997 |
| JP | 9-270927 | 10/1997 |
| JP | 10-164381 | 6/1998 |

OTHER PUBLICATIONS

U.S. Appl. No. 10/923,724 to Chida, filed Aug. 24, 2004.

(Continued)

*Primary Examiner*—Douglas Q Tran
(74) *Attorney, Agent, or Firm*—Greenblum & Bernstein, P.L.C.

(57) ABSTRACT

A color space transformation matrix calculating system is provided that optimizes a color space transformation matrix. The matrix is obtained as a product of a first and a second matrix and transforms colors in a first color space to colors in a second color space. The system comprises first and second optimizers that calculate elements of the first matrix and second matrix by multiple linear regression analysis. The input colors which correspond to color patches and hue corrected colors obtained by using the first matrix and the input colors are set as explanatory variables. First and second goal colors respectively relating to hue and saturation in a second color space, and which correspond to the color patches, are set as criterion variables. The elements of matrices are set as partial regression coefficients.

7 Claims, 11 Drawing Sheets

OTHER PUBLICATIONS

English language Abstract of JP 5-244403.
English language Abstract of JP 7-274019.
English language Abstract of JP 9-270927.
English language Abstract of JP 5-122511.
English language Abstract of JP 10-164381.
English language Abstract of JP 7-177364.
English language Abstract of JP 9-009656.
English language Abstract of JP 8-275007.

\* cited by examiner

COLOR-SPACE TRANSFORMATION-MATRIX CALCULATING SYSTEM AND CALCULATING METHOD

BACKGROUND OF THE INVENTION

1. Field of the Invention

The present invention relates to a color adjusting method that optimizes color signals to improve the reproduction of a color image of an object. Further, the present invention relates to a color-space transformation-matrix calculation method that optimizes matrix elements for adjusting color signals.

2. Description of the Related Art

In recent years, it has become popular to digitalize images for convenience of transmitting the image information precisely between different types of devices. For example, an image input device, such as a digital camera, an image scanner, and so on, transform color images of an object to signals representing the three primary colors, such as RGB signals, and then output the signals to an image output device, such as a monitor, a printer, and the like. Generally, the image output device reproduces the color image in accordance with the RGB signals, i.e. indicating an image on a screen or printing out an image on paper. The RGB signals obtained by the image input device depend on the characteristics of the optical system of the photographing lens, color filter, imaging device, and so on. Further, the images reproduced by the image output device are also different from one another in regard to how they are reproduced even when the same RGB signals are supplied. Furthermore, the characteristics of the image input device and the image output device are different, since each device has peculiar characteristics. Therefore the reproduction of a color image based on the RGB signals is disadvantageous for reproducing the original color of the object. Therefore, the RGB signal based method is poor for reproducing precise color.

Accordingly, color signals based on the sRGB standard which is a standard for the image input devices and image output devices, is generally used these days. The image input device outputs color signals after transforming the obtained RGB signals to signals based on the sRGB standard. Thereby, precise color reproduction is performed as long as the image output devices are comparable with the sRGB standard. Namely, tints quite similar to the original object can be reproduced. A variety of methods for performing color adjustment are known in the art. For example, the reproduced color is converted to the original color by adjusting the spectrum characteristics of an optical filter, provided in an imaging system, to the sRGB standard or by transforming the RGB signals electronically by a matrix transformation.

Conventionally, multiple linear regression analysis is used to improve the accuracy of color transformation methods that use a color space transformation matrix for electronic color adjustment. The multiple linear regression analysis optimizes the matrix elements by a statistical analysis which considers the relation between the original color and the reproduced color as a cause and effect relation. Namely, the matrix elements are obtained by optimizing these elements under the condition that the difference between the signal levels of the predicted reproduced colors, which is obtained by performing a provisional color space transformation matrix operation on the RGB signals from the imaging system, and the signal levels of the original colors, is below or equal to a permissible value. For example, a method that uses multiple linear regression analysis to provide a matrix that transforms RGB signals to XYZ signals of a different calorimetric system, is disclosed in the Japanese unexamined patent publication (KOKAI) No. 10-164381.

The degree of coincidence between the reproduced colors and the original color is generally evaluated by using three elements that are based on the human physiological color sense, such as hue, saturation, and lightness. Particularly, the difference in hue tends to be sensed as a difference in tint by a person. However, the relations between the RGB signals and the hue are not linear relations, therefore, the evaluation of accuracy for the above discussed multiple linear regression analysis is difficult. Namely, even when the difference between the signal levels of the RGB signals and the signal levels of the original color is within the permissible range, the difference in the hue might be such that the colors are regarded as different colors by a person.

SUMMARY OF THE INVENTION

Therefore, an object of the present invention is to provide a color space transformation matrix that has the advantage of accurately reproducing an original color, particularly in regard to hue.

According to the present invention, a color space transformation matrix calculating system that optimizes a color space transformation matrix is provided. The color space transformation matrix is a matrix for transforming a color in a first color space to a color in a second color space and is a product of a first matrix and a second matrix. Further, the system comprises a first and second optimizer.

The first and second optimizers calculate elements of the first and second matrices by multiple linear regression analysis. Input colors in the first color space, which correspond to a plurality of color patches, are set as first explanatory variables. First goal colors that relate to hue in a second color space and which correspond to the color patches are set as first criterion variables. Further, the elements of the first matrix are set as partial regression coefficients. Saturation and hue for each of the color patches differ slightly from each other. Further, a second optimizer calculates elements of a second matrix by multiple linear regression analysis. Hue corrected colors obtained by using the first matrix and the input colors in the first color space are set as second explanatory variables. Second goal colors that relate to saturation in a second color space and which correspond to the color patches are set as second criterion variables. The elements of the second matrix are set as partial regression coefficients.

Further, a method for calculating and optimizing a color space transformation matrix is provided. The color space transformation matrix transforms colors in a first color space to colors in a second color space. The method comprises steps of optimizing elements of first and second matrices by using multiple linear regression analysis.

To optimize the elements of the first matrix, input colors in the first color space, which correspond to a plurality of color patches, are set as first explanatory variables. First goal colors that relate to hue in a second color space and which correspond to the plurality of color patches are set as first criterion variables. The elements of the first matrix are set as partial regression coefficients.

Further, to optimize the elements of the second matrix by using multiple linear regression analysis, hue corrected colors obtained by using the first matrix and the input colors in the first color space are set as second explanatory variables. Second goal colors that relate to saturation in a second color space and which correspond to the plurality of color patches are set as second criterion variables. Further, the elements of the second matrix are set as partial regression coefficients.

Further, according to the present invention, a color space transformation matrix calculating system that comprises a matrix optimizer is provided.

The matrix optimizer calculates elements of the color space transformation matrix, by using the least square method, and based on input colors in the first color space and goal colors in the second color space. The input and goal colors correspond to colors of the color patches. Saturation and hue for each of the color patches differ slightly from each other.

Furthermore, according to the present invention, a method for calculating a color space transformation matrix is provided that optimizes elements of the color space transformation matrix, by using the least square method, and based on input colors in the first color space and goal colors in the second color space.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
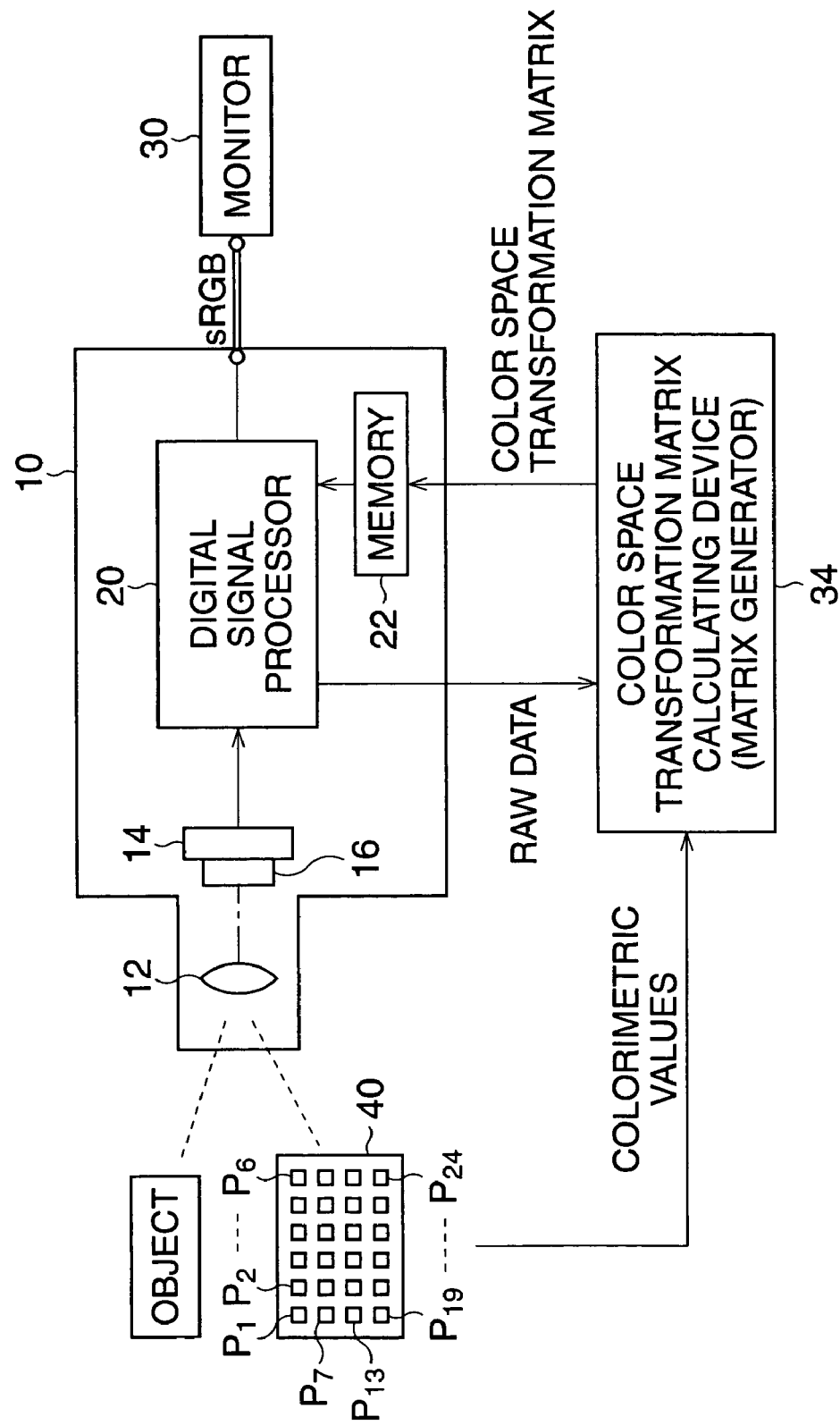
FIG. 1 schematically illustrates how the color space transformation matrix is calculated and a method for a color transformation, in the first embodiment.

The present invention is described below with reference to the embodiments shown in the drawings.

FIG. 1 schematically illustrates a first embodiment and shows how the color space transformation matrix is calculated and the method for color transformation, in the present embodiment.

The digital still camera 10 is an example of an image input device that captures a full color image of an object by using an imaging device. The digital still camera 10 includes an imaging optical system 12 and an imaging device, such as a CCD 14. The CCD 14, for example, is provided with an RGB color chip filter 16 which is mounted in front of the imaging surface of the CCD 14. An optical image produced on the imaging device, through the imaging optical system 12, is subjected to photoelectrical conversion by the CCD 14 and output therefrom as analog signals. The output analog signals are then subjected to analog signal processes and A/D conversion. Thereby the digital image signals are fed to a digital signal processor 20 as one frame of RAW data.

The digital signal processor 20, carries out a color separation process, a white balance adjusting process, a color adjusting process, and a gradation adjusting process, in order, and generates the sRGB signals in the second color space. The color separation process generates RGB signals from the RAW data for each pixel. The white balance adjusting process optimizes each of the R, G, and B gains in accordance with the standard white signal values. The color adjusting process transforms the color gamut of the primary RGB signals in the first color space to the gamut defined by the sRGB standard in order to bring the reproduced colors close to the objective colors (ex. the original color of the object). The gradation adjusting process optimizes the gradation to counterbalance the gamma characteristics of the monitor 30. The digital signal processor 20 is able to transmit the sRGB signals to external devices, including an image output device, such as the monitor 30 (CRT or LCD) connected to a personal computer, a printer (not depicted), and so on, via an interface (not depicted).

The sRGB signals are signals that are based on the international standard for color reproduction that was standardized by IEC. Further, in the sRGB standard, the color reproduction and gamut are prescribed based on the standard CRT monitor. In this case, the prescribed standard white values for the white balance adjusting process is preset to CIE-$D_{65}$. Further, the gamut of the RGB signals is adjusted to a prescribed gamut by the color adjusting process and the gamma value is preset as 2.2 in the gradation adjusting process.

In the digital signal processor 20, the signal processing is carried out based on the sRGB standard. However, devices having characteristics matching the sRGB standard are not always used by the imaging system (including the imaging optical system 12, CCD 14, RGB color chip filter 16, etc.). Therefore, the color information of the object obtained by this system is not precisely adjusted to the sRGB standard and the reproduced colors do not coincide with the original colors. Although, various types of optical compensating techniques have been applied to compensate for the sensitivity characteristics of the imaging system, regarding the sRGB standard, they are not sufficient to achieve the complete coincidence, and in fact, the attainment of complete coincidence is extremely difficult. Therefore, the discrepancy in the characteristics of the imaging system regarding the sRGB standard may be compensated for by electronically adjusting the signal level of the RGB signals obtained by the imaging system. However, the sensitivity characteristics of the imaging system are peculiar to each digital still camera, and are different from each other. Therefore, it is impossible to logically define the relationship between the original color information of the object and the color information obtained by the digital still camera 10, since they do not have any regular relationship, so that the signal processing should include processes that are peculiar to each of the colors. When each of the R, G, and B signals is represented by 8-bit data, the number of colors will become $(2^8)^3=167777216$, thus it is impractical to carry out optimum color adjusting processes for all the colors.

Consequently, a color space transformation matrix is previously calculated and preset in the digital still camera. The color space transformation matrix is obtained by using a color chart having a plurality of color samples where the saturation and hue are phased, such as the Macbeth color checker 40 (registered trademark) having 24 color patches $P_1$-$P_{24}$ as described in FIG. 1, where only part of the color patches are numbered for convenience. Namely, the elements of the matrix are defined so that the RGB signals of the color patches, obtained by the digital still camera 10, coincide with the corresponding RGB signals obtained by a colorimeter. The colors of the color patches are accurately determined by the calorimeter. Further, the color chart must be imaged by the digital still camera 10 under the same illumination conditions adopted in the color determination carried out by the calorimeter. When the object is imaged, the color adjusting process performed by the digital signal processor 20 is carried out by applying the above-obtained color space transformation matrix. Thereby, high fidelity color reproduction can be achieved regarding the values obtained by the calorimeter.

The color space transformation matrix may be obtained by an externally provided color space transformation-matrix calculating device or matrix generator 34, such as a personal computer, and may be initially stored in a memory 22 of the digital still camera 10. The digital still camera 10 transmits the RAW data, which are obtained by means of imaging the Macbeth color checker 40, to the matrix generator 34 from the digital signal processor 20. The color space transformation matrix is a 3×3 matrix that is determined at the final stage of the manufacturing processes of the digital still camera 10, in cooperation with the matrix generator 34, where the nine matrix elements of the matrix are determined depending on the spectral sensitivity characteristics of the individual imaging system mounted in each digital still camera 10

The relations between the input RGB signals $C_{in}$ ($R_{in}$, $G_{in}$, $B_{in}$) and the output RGB signals $C_{es}$ ($R_{es}$, $G_{es}$, $B_{es}$) can be described by a linear equation, such as Eq. (1), where "$C_{in}$" denotes an input color which is given by the RAW data, "M" denotes the color space transformation matrix, and "$C_{es}$" denotes a corrected color which is obtained by using the color transformation matrix M for the input color $C_{in}$. Further, the below Eq. (2) describes Eq. (1) by using the matrix elements, where variables $m_1$-$m_9$ are the matrix elements of the color space transformation matrix M.

$$Ces = M \cdot Cin \quad (1)$$

$$\begin{pmatrix} R_{es} \\ G_{es} \\ B_{es} \end{pmatrix} = \begin{pmatrix} m_1 & m_2 & m_3 \\ m_4 & m_5 & m_6 \\ m_7 & m_8 & m_9 \end{pmatrix} \begin{pmatrix} R_{in} \\ G_{in} \\ B_{in} \end{pmatrix} \quad (2)$$

Note that, since the purpose of the present embodiment is to achieve precise color reproduction, the objective values or goals that are set for calculating the color space transformation matrix M are preset to the colorimetric values of the color patches $P_1$-$P_{24}$. However, when it is desirable to reproduce particular colors, such as human skin color or a blue-sky color, as preferred colors and not the precise colors, the values which are obtained by matching the calorimetric values with reference to the particular colors, may be preset as the objective values. Further, the RGB signals given by the calorimetric values can be directly obtained by measuring the levels of each of the R, G, and B signals with a color-measuring instrument. Further, the spectral reflectance may be measured by a spectrophotometer, or the color-measuring instrument may obtain XYZ signals or L*a*B* signals, which are for systems other than the RGB color system. In these cases, the spectral reflectance, the XYZ signals, and L*a*b* signals may be converted to the RGB signals.

Since the Macbeth color checker 40 is a ready-made item in the market, it is easy to obtain. Further, since the calorimetric values of the patches $P_1$-$P_{24}$ are already known, it can save time and expense for the calorimetric operations. For example, the colorimetric signals or values of the first color patch $P_1$ (dark skin) are x=0.4002, y=0.3504, and Y=10.05, and they can be transformed to RGB signals by using the well-known formula, where x=X/(X+Y+Z), y=Y/(X+Y+Z) and X, Y, and Z are the tristimulus values of the XYZ color system. The first to eighteenth color patches $P_1$-$P_{18}$ are chromatic colors and the nineteenth to twenty-fourth color patches $P_{19}$-$P_{24}$, in the lowest line, are achromatic colors.

The color chart is not restricted to the Macbeth color checker chart described in the present embodiment, but can also be a color chart of which color patches are distributed uniformly over a uniform color space, such as the JIS standard color chart. The color space transformation matrix obtained based on the Macbeth color checker 40 can precisely reproduce the colors corresponding to each of the color patches $P_1$-$P_{24}$, however, it does not guarantee the precise reproduction of other colors. Therefore, when a peculiar color chart that includes the specific colors (human skin color, blue sky color, and verdure color), which may appear frequently in photography, is prepared and used, these specific colors can be reproduced with fidelity.

Figure 2:
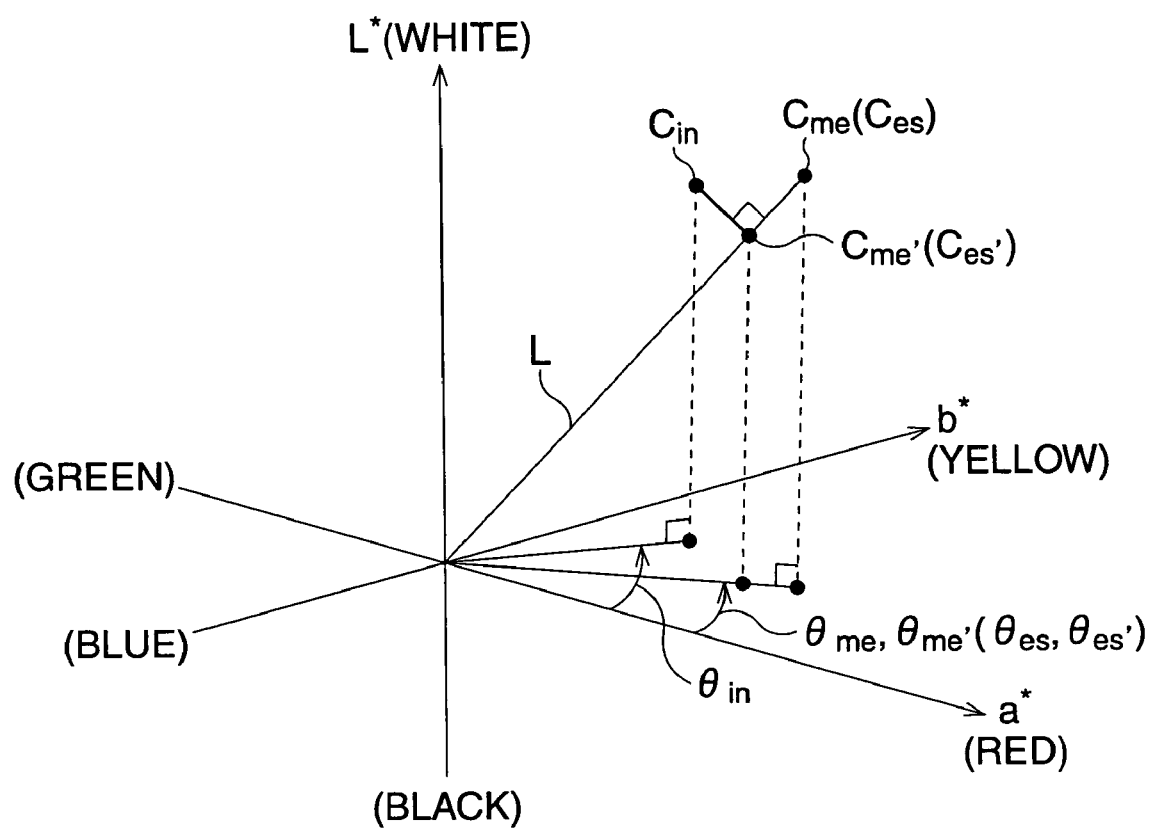
FIG. 2 illustrates the CIE-L*a*b* color space where the illuminating light source is the standard light of CIE-$D_{65}$, which represents day light of 6504 K color temperature.
Figure 3:
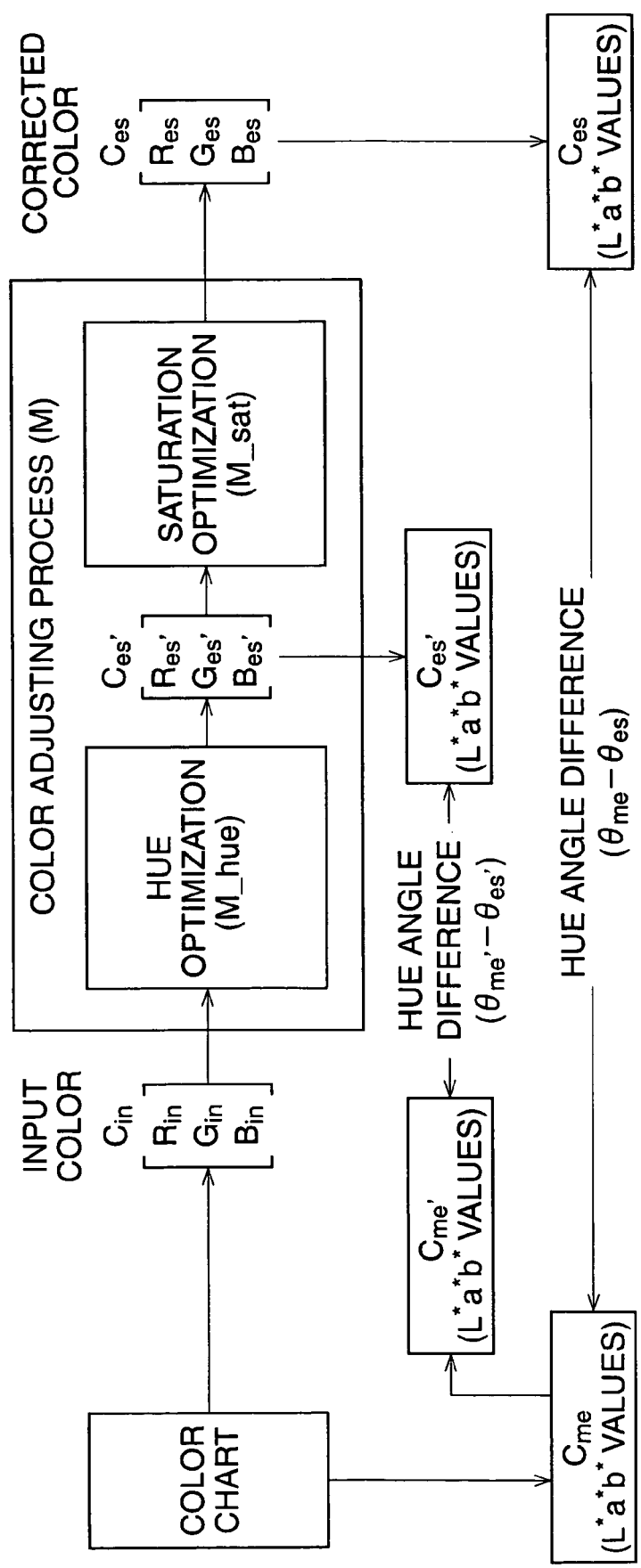
FIG. 3 is a block diagram schematically showing the processes that are carried out in the color space transformation matrix calculating process and the relations between each of the color signals.

With reference to FIG. 2 and FIG. 3, the calculation of the color space transformation matrix will be explained. In FIG. 2, the CIE-L*a*b* color space (in the following, simply referred to as Lab color space) is depicted, where the light source illuminates a standard light of CIE-D65, which represents day light of 6504 K color temperature. A color that corresponds to an input color $C_{in}$ and an objective color $C_{me}$ (hereinafter, referred to as a goal color), to which the input color should be adjusted, are indicated as respective points in this Lab color space. The L*a*b* signals of the goal color $C_{me}$ are preset to the values that are obtained by the calorimeter. FIG. 3 is a block diagram schematically showing the processes being carried out in the color space transformation matrix calculating process and the relations between each of the color signals.

In the matrix operations, colors are dealt with in the same way as RGB signals. However, L*a*b* signals are used to evaluate the coincidence between the colors. This is because the Lab color space is a uniform color space that has good correlation with the human color perception with respect to distance of the coordinates. Any color can be represented by the L* dimension relating to lightness, and the two remaining dimensions, a* and b*, relating to hue and saturation. The lightness dimension L* indicates lightness by the dimension from 0%, which corresponds to black, to 100%, which corresponds to white. The hue is indicated by an angle in the a*b*-plane, orthogonal to L* with respect to the origin, such that it is within the range from 0° to 360°. As a positive value along the a* axis increases, red is enhanced, and opposite to this, as a negative value increases, green is enhanced. Further, as a positive value along the b* axis increases, yellow is enhanced, and opposite to this, as a negative value increases, blue is enhanced. Namely, the saturation increases as the radius from the origin increases, and a color becomes more vivid. At the origin, it is achromatic.

The transformation from RGB signals to L*a*b* signals is performed using the following well known Eqs. (3) and (4). Eq. (3) is a formula to transform the RGB signals to the XYZ signals. Eq. (4) is a formula to transform the XYZ signals to the L*a*b* signals. When evaluating the coincidence of colors, the RGB signals are transformed to the L*a*b* signals via the XYZ signals. On the other hand, when operating the matrix, the L*a*b* signals are again transformed to the RGB signals via the XYZ signals. The transformations from the L*a*b* signals to the RGB signals are carried out by using the inverse transformations of Eqs. (3) and (4), however they are not specified here.

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R \\ G \\ B \end{pmatrix} \quad (3)$$

where, a viewing angle of a standard observer is 2° and the standard CIE-D65 illumination is used.

$$L^* = 116 \times f(Y) - 16 \quad (4)$$
$$a^* = 500 \times \{f(X) - f(Y)\}$$
$$b^* = 200 \times \{f(Y) - f(Z)\}$$

where $f(X)=X^{1/3}$ when $X/95.047 \leq 0.008856$, $f(X)=7.787X+16/116$ when $0.008856 < X/95.047$, $f(Y)=Y^{1/3}$ when $Y/100.000 \leq 0.008856$, $f(Y)=7.787Y+16/116$ when $0.008856 < Y/100.000$, $f(Z)=Z^{1/3}$ when $Z/108.883 \leq 0.008856$, and $f(Z)=7.787Z+16/116$ when $0.008856 < Z/108.883$.

In the present embodiment, the color space transformation matrix M is optimized, so that the hues of the corrected colors $C_{es}$ obtained from the input colors $C_{in}$, which relate to the eighteen colors of the color patches $P_1$-$P_{18}$, coincide with those of the corresponding respective goal colors $C_{me}$, and then the optimization regarding the saturation is performed. The degree of coincidence between the corrected color $C_{es}$ and the goal color $C_{me}$ is estimated in the Lab color space, in accordance with the difference between the hue angle $\theta_{es}$ of the corrected color $C_{es}$ and the hue angle $\theta_{ms}$ of the goal color $C_{me}$. Hue angle $\theta$ (such as $\theta_{es}$ and $\theta_{ms}$) is a rotating angle of a point, which is obtained by projecting each point in the three-dimensional Lab color space onto the a*b*-plane, about the origin measured from the a*-axis, and is defined by Eq. (5). The hue angles $\theta_{es}$ and $\theta_{ms}$ are respectively obtained by substituting the a* coordinate value and the b* coordinate value of the corrected color $C_{es}$ and the goal color $C_{me}$ into Eq. (5). In the present embodiment, the coincidence of the hue has priority, since a difference in the hue is more easily recognized as a difference in the color, when compared to a difference in saturation, due to the nature of human perception.

$$\theta = \tan^{-1}\left(\frac{b^*}{a^*}\right) \quad (5)$$

An input color $C_{in}$ is orthogonally projected onto a line L that connects the origin and a goal color $C_{me}$ in the Lab color space and the color of the projected point is set as a hue optimizing goal color $C_{me}'$ in order to adjust the hue. The transformations from the L*a*b* signals of the hue optimizing goal color $C_{me}'$ to the RGB signals via the XYZ signals are then carried out for all eighteen colors, so that a hue-optimizing matrix M_hue (the first matrix) which matches each of the input colors $C_{in}$, corresponding to the eighteen colors, with the corresponding hue optimizing goal colors $C_{me}'$, is obtained by means of multiple linear regression analysis. The RGB signals of the hue optimizing goal color $C_{me}'$ are the primary goal color signals which relate to the hue. The line L is a set of points corresponding to colors having a hue which is identical to that of the goal color $C_{me}$. The hue optimizing goal color $C_{me}'$, where the input color $C_{in}$ is orthogonally projected onto the line L, is a color which has the same hue as the goal $C_{me}$ and which is nearest to the input color $C_{in}$ in the Lab color space. Namely, the hue can be adjusted by the minimum distance in the Lab color space when setting the hue optimizing goal color $C_{me}'$ as the goal color. Note that, in FIG. 2, only one color is depicted as a representative color. The hue corrected colors $C_{es}'$, obtained by using the hue-optimizing matrix M_hue on each of the input colors $C_{in}$, substantially coincide with the corresponding hue optimizing goal colors $C_{me}'$.

A saturation-optimizing matrix M_sat (the second matrix) which is used to match each of the hue-corrected colors $C_{es}'$, corresponding to the eighteen colors, to the corresponding goal colors $C_{me}$, is obtained by means of multiple linear regression analysis to adjust the saturation. The RGB signals of the goal color $C_{me}$ are the secondary goal color signals relating to saturation. The corrected colors $C_{es}$, obtained by using the saturation-optimizing matrix M_sat for each of the hue corrected colors $C_{es}'$, substantially coincide with the corresponding goal colors $C_{me}$.

The color space transformation matrix M for transforming the input color $C_{in}$ to the corrected color $C_{es}$ is obtained by the product of the hue-optimizing matrix M_hue, which approximates hue for the goal color $C_{me}$, and the saturation-optimizing matrix M_sat, which approximates saturation for the goal color $C_{me}$, as described in the following Eq. (6). The formula equivalent to Eq. (6) using matrix elements is indicated by Eq. (7). Where, variables $m''_1$-$m''_9$ are the matrix elements of the hue-optimizing matrix M_hue and variables $m'_1$-$m'_9$ are the matrix elements of the saturation-optimizing matrix M_sat.

$$M = M\_sat \cdot M\_hue \quad (6)$$

$$\begin{pmatrix} m_1 & m_2 & m_3 \\ m_4 & m_5 & m_6 \\ m_7 & m_8 & m_9 \end{pmatrix} = \begin{pmatrix} m''_1 & m''_2 & m''_3 \\ m''_4 & m''_5 & m''_6 \\ m''_7 & m''_8 & m''_9 \end{pmatrix} \begin{pmatrix} m'_1 & m'_2 & m'_3 \\ m'_4 & m'_5 & m'_6 \\ m'_7 & m'_8 & m'_9 \end{pmatrix} \quad (7)$$

Namely, the transformation of the input color $C_{in}$ to the corrected color $C_{es}$ by using the color space transformation matrix M is achieved by carrying out the saturation optimization process after carrying out the hue optimization process, to match the input color $C_{in}$ to the corrected color $C_{es}$ (refer to Eq. (8)).

$$\begin{aligned} Ces &= M \cdot C_{in} \quad (8) \\ &= (M\_sat \cdot M\_hue) \cdot C_{in} \\ &= M\_sat \cdot (M\_hue \cdot C_{in}) \\ &= M\_sat \cdot C'_{es} \end{aligned}$$

Figure 4A:
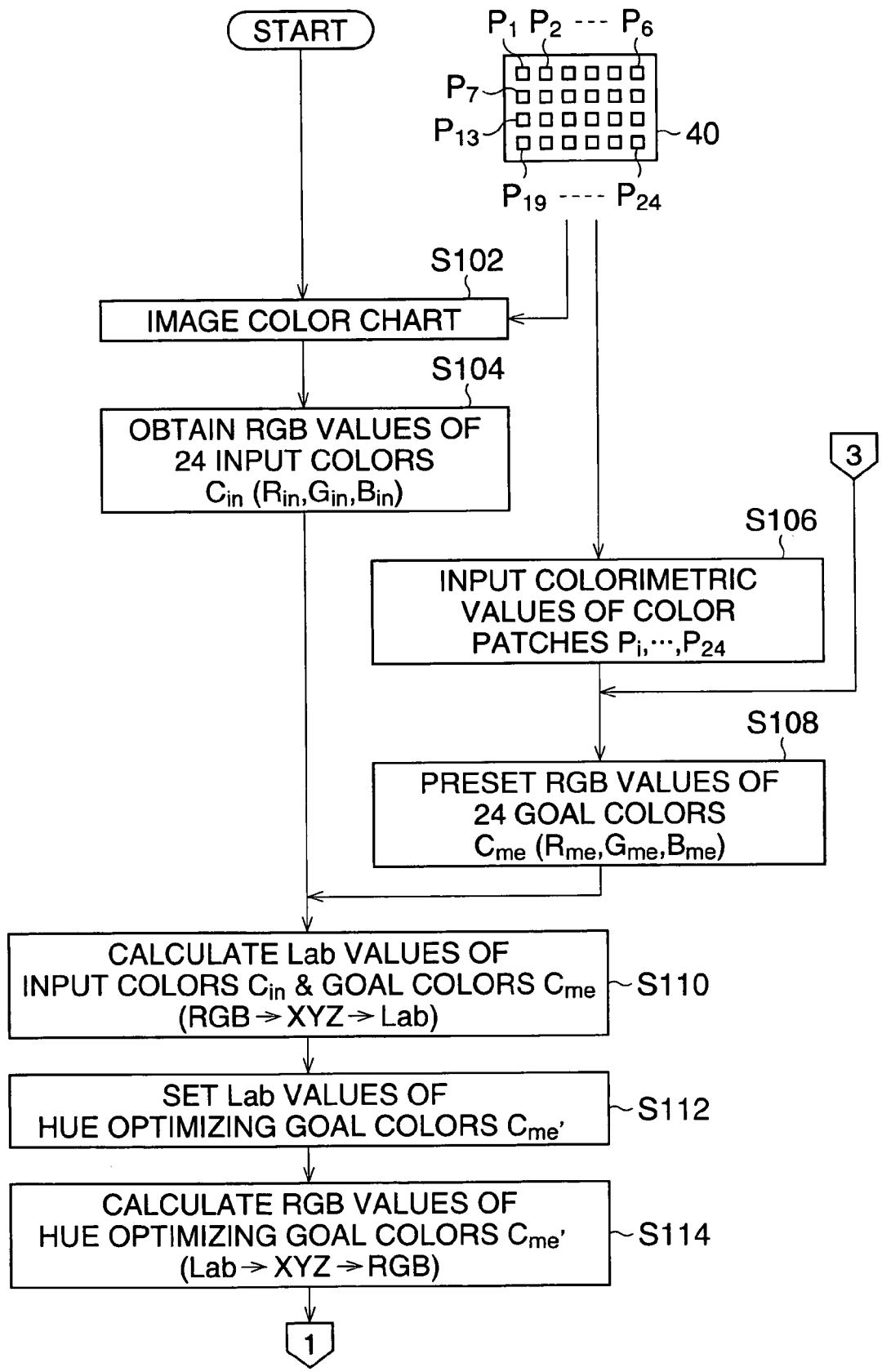
FIGS. 4A-4C are flow charts of the color space transformation calculating processes.
Figure 4B:
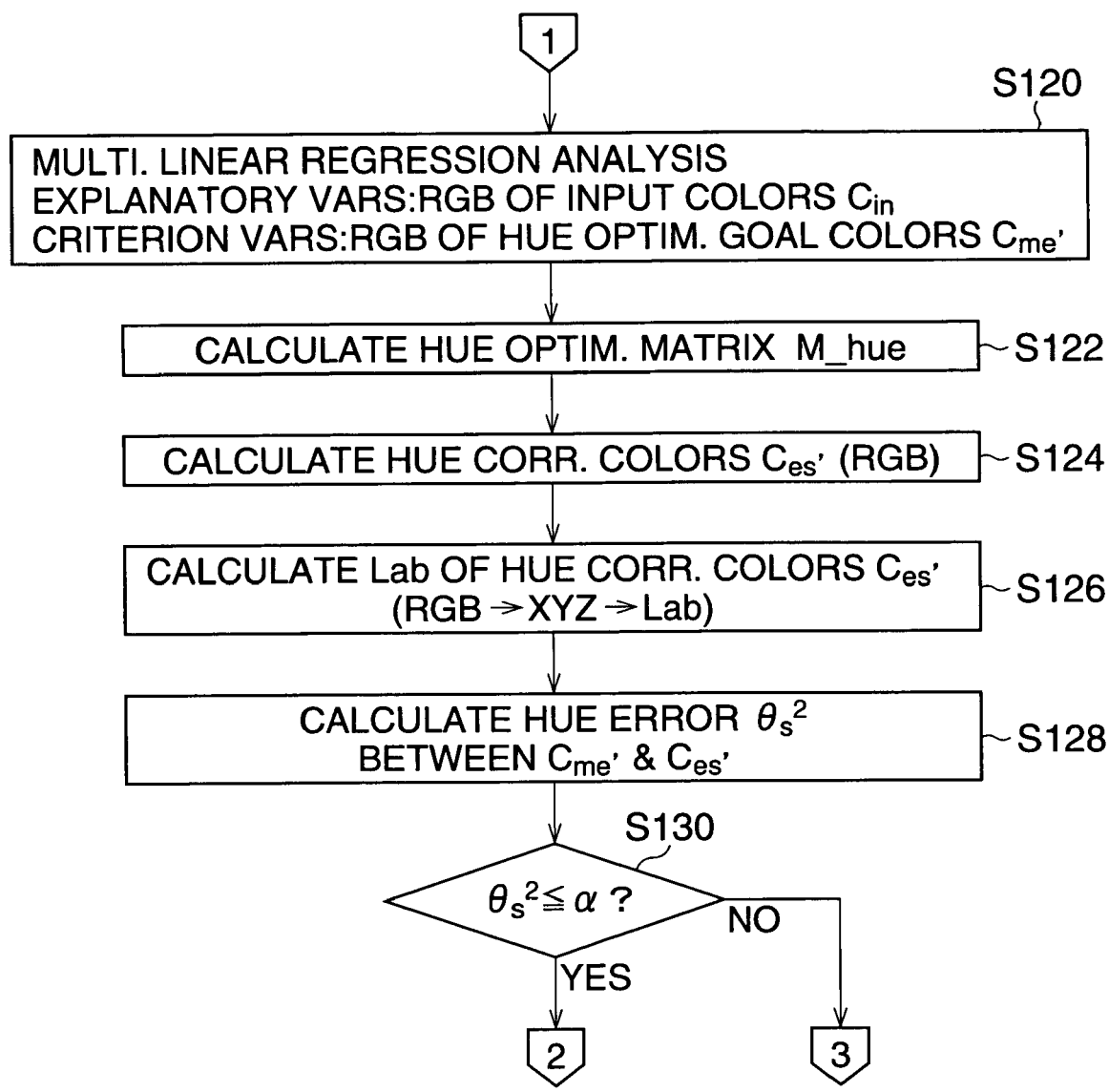
Figure 4C:
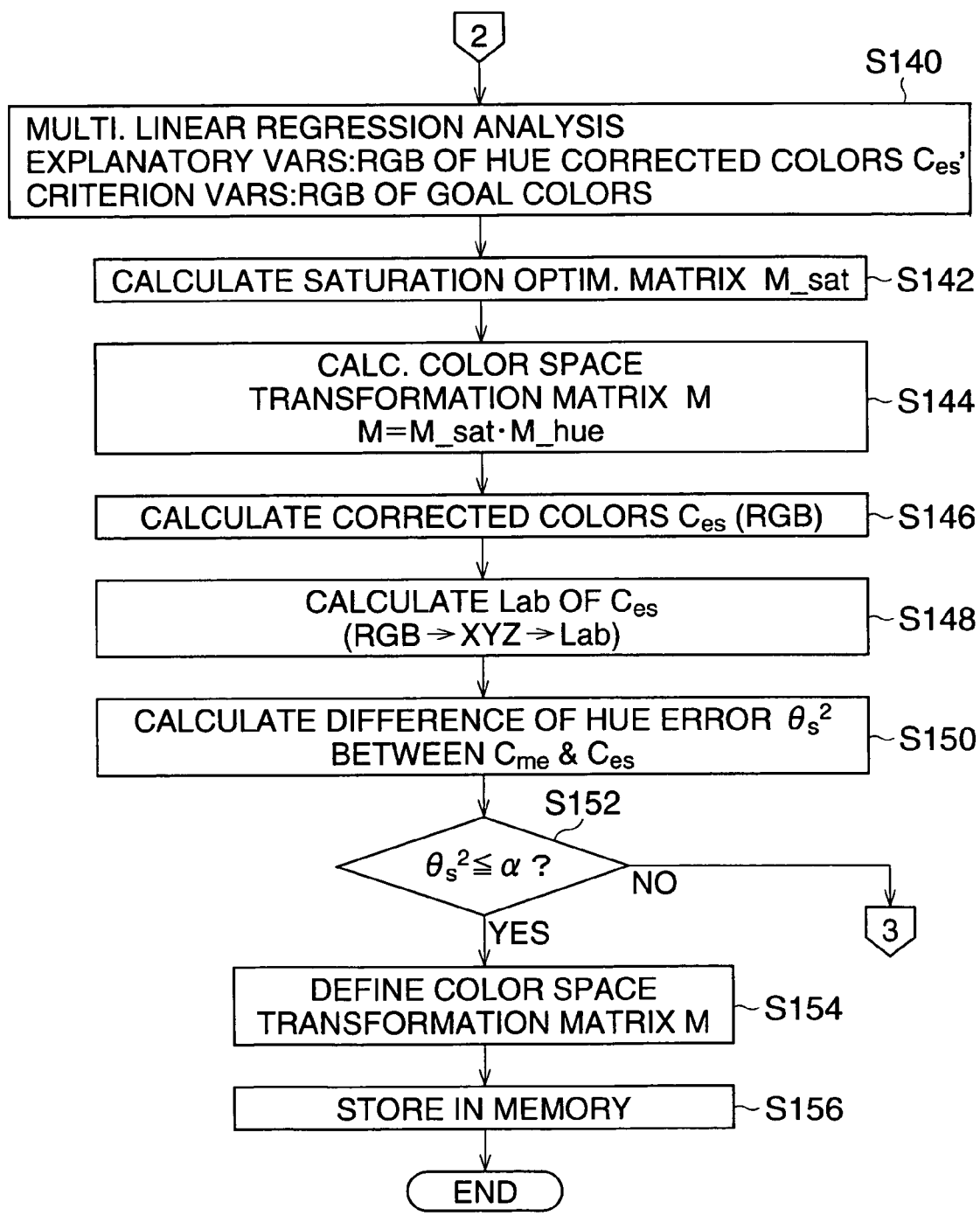

Next, with reference to the flow charts of FIGS. 4A to 4C, the color space transformation calculating process is explained in detail.

In Step S102, the Macbeth color checker 40 having twenty-four colors of color patches $P_1$-$P_{24}$ is prepared. These twenty-four colors, color patches $P_1$-$P_{24}$, are imaged by the digital still camera 10 under the illumination condition of CIE-$D_{65}$, and then the RAW data obtained by the preceding photographing operations are transmitted to the matrix generator 34.

The matrix generator 34 obtains the RGB signals of the input colors $C_{in}$, which correspond to the eighteen chromatic color patches $P_1$-$P_{18}$, in accordance with the RAW data (Step S104). Here, to discriminate color data corresponding to each of the chromatic color patches $P_1$-$P_{18}$, parameters i (i=1,2, . . . ,18) indicating the order of the chromatic color patches $P_1$-$P_{18}$ are defined. Further, the input color corresponding to the i-th color patch $P_i$ is represented by $C_{in}(i)$ and its RGB signals are represented by ($R_{in}(i)$, $G_{in}(i)$, $B_{in}(i)$). The RGB signals ($R_{in}(i)$, $G_{in}(i)$, $B_{in}(i)$) of the input color $C_{in}(i)$ are the mean values (hereinafter, referred to as RGB mean values) of each of the RGB signals for the 30×30 pixels selected from the imaging area corresponding to the color patch $P_i$, and are 8-bit data. To secure the reliability of the RGB mean values, defect pixels are excluded from the 30×30 pixels. Note that for the RGB signals, ($R_{in}(i)$, $G_{in}(i)$, $B_{in}(i)$) 10-bit data, 12-bit data, and so on, can be used.

The 19th to 24th color patches $P_{19}$-$P_{24}$ of the Macbeth color checker 40 are achromatic colors in six steps. In detail, the 19th color patch $P_{19}$ is white, the 20th color patch $P_{20}$ is gray 8, the 21st color patch $P_{21}$ is gray 6.5, the 22nd color patch $P_{22}$ is gray 5, the 23rd color patch $P_{23}$ is gray 3.5, and the 24th color patch $P_{24}$ is black.

These six color patches $P_{19}$-$P_{24}$, the achromatic colors, are used to adjust the gray scale. Specifically, the RGB mean values are obtained form 30×30 pixels that are selected from the imaging area corresponding to each of the color patches $P_{19}$-$P_{24}$, and in turn offset values for each of the R, G, and B colors are obtained so as to minimize the difference between the RGB mean values of the six achromatic color patches $P_{19}$-$P_{24}$ and each of the corresponding goal values (e.g. calorimetric signals) Prior to the acquisition of the RGB signals ($R_{in}(i)$, $G_{in}(i)$, $B_{in}(i)$) of the input color $C_{in}(i)$ for the chromatic color patches Pi (i=1,2, . . . , 18) in step S104, each of the offset values are deducted from the R, G, and B signals of the RAW data, so that the white and black levels for the image are adjusted, and at the same time, the gray scale is adjusted to the appropriate level. Note that, the gray scale or tone is normalized by γ=1.0.

Further, the six achromatic color patches $P_{19}$-$_{24}$ are also used in the white balance correction, such that the R, G, and B gains are defined based on the RGB mean values of each of the achromatic color patches $P_{19}$-$P_{24}$ from the RAW data, and thereby the RGB mean values of the eighteen chromatic color patches $P_1$-$P_{18}$ are obtained under the corrected gains.

Therefore, the RGB signals ($R_{in}(i)$, $G_{in}(i)$, $B_{in}(i)$) of the input color $C_{in}(i)$ for the eighteen chromatic color patches Pi (i=1, 2, . . . , 18) obtained in step S104 have already been subjected to the gray scale correction and the white balance correction, and are normalized by γ=1.0.

Further, in step S106, the colorimetric signals (RGB signals) of the eighteen color patches $P_1$-$P_{18}$, which are already known, are input to the matrix generator 34. Note that, when the input data are not RGB signals, such as XYZ signals, L*a*b* signals, or spectral reflectance signals, they are transformed to the RGB signals by well-known formulations. Further, when the colorimetric signals are unknown, the color patches $P_1$-$P_{18}$ are measured under the same illumination condition as the above imaging, prior to step S106.

In step S108, the goal color of the i-th (i=1,2, . . . , 18) color patch $P_i$ is defined as $C_{me}(i)$ and its RGB signals are defined as ($R_{me}(i)$, $G_{me}(i)$, $B_{me}(i)$). Further, the calorimetric signals obtained in step S106 are preset as the RGB signals ($R_{me}(i)$, $G_{me}(i)$, $B_{me}(i)$) of the goal color $C_{me}(i)$. In the present embodiment, since precise color reproduction is desired, the colorimetric signals are preset as the RGB signals ($R_{me}(i)$, $G_{me}(i)$, $B_{me}(i)$) of the goal color $C_{me}(i)$, however, when reproduction of specific colors is preferred, the values of $R_{me}(i)$, $G_{me}(i)$, and $B_{me}(i)$ can be replaced in accordance with requirements. Note that, steps S106 and S108 can be carried out anytime before step In step S110, the RGB signals ($R_{in}(i)$, $G_{in}(i)$, $B_{in}(i)$) of the eighteen input colors $C_{in}(i)$ (i=1,2, . . . ,18), obtained in step S104, are transformed to the L*a*b* signals via the XYZ signals using Eqs. (3) and (4). Similarly, the RGB signals ($R_{me}(i)$, $G_{me}(i)$, $B_{me}(i)$) of the eighteen goal colors $C_{me}(i)$ (i=1, 2, . . . , 18), obtained in step S108 are transformed to the L*a*b* signals.

In step S112, the hue optimizing goal colors $C_{me}'(1)$-$C_{me}'(18)$ are preset for each of the eighteen colors and the corresponding L*a*b* signals are obtained. Namely, a point in the Lab color space which is obtained by orthogonal projection of the input color $C_{in}(i)$ onto the line connecting the i-th goal color $C_{me}(i)$ (i=1, 2, . . . , 18) and the origin of the Lab color space is preset as the hue optimizing goal color $C_{me}'(i)$, and its L*a*b* coordinates are obtained. Further, in step S114, the L*a*b* signals of the hue optimizing goal colors $C_{me}'(1)$-$C_{me}'(18)$ are transformed to the RGB signals via the XYZ signals and the RGB signals ($R_{me}'(1)$, $G_{me}'(1)$, $B_{me}'(1)$) to ($R_{me}'(18)$, $G_{me}'(18)$, $B_{me}'(18)$) are obtained.

In step S120, multiple linear regression analysis is carried out. The multiple linear regression analysis is configured such that the multiple linear regression model assumes the RGB signals of the eighteen input colors $C_{in}(1)$-$C_{in}(18)$ as a set of explanatory variables, the RGB signals of the eighteen hue optimizing goal colors $C_{me}'(1)$-$C_{me}'(18)$ as a set of criterion variables, and the matrix elements $m'_1$-$m'_9$ of the hue-optimizing matrix M_hue as partial regression coefficients. In step S122, the matrix elements $m'_1$-$m'_9$ of the hue-optimizing matrix M_hue are obtained.

In this multiple linear regression model, a linear formula, as described by Eq. (9), is assumed for the eighteen colors. The formula is expressed by matrices $B_{in}$ and $B_{me}'$, which represent the RGB signals of the input colors $C_{in}(1)$-$C_{in}(18)$ as column vectors and hue optimizing goal colors $C_{me}'(1)$-$C_{me}'(18)$, and the hue-optimizing matrix M_hue which is comprised of the partial regression coefficients. Eq. (9) is also expressed by the matrix elements as Eq. (10).

$$B_{me}' = M\_hue \cdot B_{in} \quad (9)$$

$$\begin{pmatrix} R'_{me}(1) & R'_{me}(2) & \cdots & R'_{me}(18) \\ G'_{me}(1) & G'_{me}(2) & \cdots & G'_{me}(18) \\ B'_{me}(1) & B'_{me}(2) & \cdots & B'_{me}(18) \end{pmatrix} = \quad (10)$$

$$\begin{pmatrix} m'_1 & m'_2 & m'_3 \\ m'_4 & m'_5 & m'_6 \\ m'_7 & m'_8 & m'_9 \end{pmatrix} \begin{pmatrix} R_{in}(1) & R_{in}(2) & \cdots & R_{in}(18) \\ G_{in}(1) & G_{in}(2) & \cdots & G_{in}(18) \\ B_{in}(1) & B_{in}(2) & \cdots & B_{in}(18) \end{pmatrix}$$

The hue-optimizing matrix M_hue is obtained by means of well known optimization techniques, such as the least square method. Namely, the left-hand side (the RGB values of the hue optimizing goal colors $C_{me}'(1)$-$C_{me}'(18)$) and the right-hand side (the RGB values obtained by using the hue-optimizing matrix M_hue for the input colors $C_{in}(1)$-$C_{in}(18)$) of the above-described multiple linear regression model do not actually coincide with each other and there are some errors. Therefore, Eq. (9) is reformed into Eq. (10) under the conditions of minimizing the square errors between the right and left hand sides, so that the partial regression coefficients of M_hue are obtained by solving Eq. (11).

$$M\_hue = [(B_{in} \cdot B_{in}{}^t)^{-1}(B_{in} \cdot B_{me}{}'{}^t)]^t \tag{11}$$

where, $(\ )^t$ denotes a transposed matrix and $(\ )^{-1}$ denotes an inverse matrix.

When the multiple linear regression analysis is completed and the hue-optimizing matrix M_hue is obtained, the validity of the obtained hue-optimizing matrix M_hue is evaluated in the succeeding steps S124-S130.

In step S124, the RGB signals ($R_{es}(1), G_{es}(1), B_{es}(1))$-($R_{es}(18), G_{es}(18), B_{es}(18)$) of the hue corrected colors $C_{es}'(1)$-$C_{es}'(18)$ are obtained by transforming the RGB signals of the input colors $C_{in}(1)$-$C_{in}(18)$ using hue-optimizing matrix M_hue (refer to Eq. 12). In step S126, the L*a*b* signals of the hue corrected colors $C_{es}'(1)$-$C_{es}'(18)$ are obtained from the RGB signals by applying Eqs. (3) and (4) via the XYZ signals.

$$C_{es}' = M\_hue \cdot C_{in} \tag{12}$$

In step S128, a hue error $\theta s^2$ is obtained in accordance with the L*a*b* signals of the hue optimizing goal colors $C_{me}'(1)$-$C_{me}'(18)$, which were preset in step S112, and the L*a*b* signals of the hue corrected colors $C_{es}'(1)$-$C_{es}'(18)$, which were obtained in step S126. In detail, for each i-th color, i=1, 2, . . . , 18, a hue angle $\theta_{me}'(i)$ is obtained from the L*a*b* signals of the hue optimizing goal color $C_{me}'(i)$ by using Eq. (5) and a hue angle $\theta_{es}'(i)$ is obtained from the L*a*b* signals of the hue corrected color $C_{es}'(i)$ by using Eq. (5). Further, the sum of the square differences between the hue angles $\theta_{me}'(i)$ and $\theta_{es}'(i)$ for the eighteen colors is calculated as the hue error $\theta s^2$.

$$\theta_S^2 = \sum_{i=1}^{24} \{\theta_{me}'(i) - \theta_{es}'(i)\}^2 \tag{13}$$

In step S130 whether the hue error $\theta s^2$ is less than or equal to the permissible value $\alpha$ is determined. When the hue error $\theta s^2$ is beyond the permissible value $\alpha$, the process returns to step S108 and replaces at least one of the goal colors $C_{me}(1)$-$C_{me}(18)$, and further calculates a new hue-optimizing matrix M_hue. Note that, when returning to step S108, and when the RGB signals of the goal colors $C_{me}(1)$-$C_{me}(18)$ are altered, each of the values should be determined under the condition that only a small change in the hue is made, such that it would not change the tint of a reproduced color on the monitor 30 from the original color of the object.

When it is determined, in step s130, that the hue error $\theta s^2$ is below or equal to the permissible value $\alpha$, the hue-optimizing matrix M_hue is determined as a matrix that transforms the input colors $C_{in}$ to the values which precisely approximate the goal colors $C_{me}$ with respect to hue. Accordingly, steps S140-S144 are carried out to obtain the saturation-optimizing matrix M_sat.

In step S140, multiple linear regression analysis is carried out by establishing the multiple linear regression model to adjust not only hue but also saturation. This multiple linear regression model, as shown in Eq. (14), regards the RGB signals of the eighteen hue corrected colors $C_{es}'(1)$-$C_{es}'(18)$, obtained in step S124, as a set of explanatory variables and the eighteen saturation optimizing goal colors $C_{me}(1)$-$C_{me}(18)$, preset in step S108, as a set of criterion variables. The "$B_{in}$" in Eq. (14) denotes a matrix with column vectors of the hue corrected color $C_{es}'(1)$-$C_{es}'(18)$ and "$B_{me}$" denotes a matrix with column vectors of the saturation optimizing goal colors $C_{me}(1)$-$C_{me}(18)$. In step S142, the calculated partial regression coefficients $a''_1$-$a''_9$ are set as the matrix elements of the saturation matrix M_sat. The method for obtaining the saturation-optimizing matrix M_sat is the same as the method for obtaining the hue-optimizing matrix M_hue, in steps S120-S122, therefore it is not detailed here.

$$B_{me} = M\_sat \cdot B_{es} \tag{14}$$

When the saturation-optimizing matrix M_sat is obtained in step S142, the color space transformation matrix M is obtained, in step s144, by the above-described Eq. (6) or Eq. (7). The RGB signals of the input colors $C_{in}(1)$-$C_{in}(18)$ are then transformed by the color space transformation matrix M to the RGB signals ($R_{es}(1), G_{es}(1) B_{es}(1)$)-($R_{es}(18), G_{es}(18), B_{es}(18)$) of the corrected color $C_{es}(1)$-$C_{es}(18)$ in step S146, see Eqs. (1) and (2). Further, in step S148, the L*a*b* signals of the corrected colors $C_{es}(1)$-$C_{es}(18)$ are obtained from the RGB signals via the XYZ signals by using Eqs. (3) and (4). In step S150, a hue error $\theta_s^2$ between the corrected colors $C_{es}(1)$-$C_{es}(18)$ and the goal colors $C_{me}(1)$-$C_{me}(18)$ is obtained. The way in which the hue error $\theta_s^2$ is obtained, in step S150, is the same as that in step S128, thus it is not detailed here.

In step S152, whether the hue error $\theta_s^2$ is below or equal to the permissible value $\alpha$ is determined. When the hue error $\theta_s^2$ is beyond the permissible value $\alpha$, the process returns to step S108. On the other hand, when it is determined that the hue error $\theta_s^2$ is below or equal to the permissible value $\alpha$, the color space transformation matrix M is determined as a matrix that transforms the input colors $C_{in}$ to the values which precisely approximate the goal colors $C_{me}$ with respect to hue and saturation. Thereby, in step S154, the current values of the color space transformation matrix M are determined as the goal. The values of the elements of the color space transformation matrix M are transmitted to the digital still camera 10 from the matrix generator 34 and stored in the memory 22 in step S156, and thus the process ends.

Accordingly, when applying the above-obtained color space transformation matrix M for a color adjusting process of the digital still camera 10, sRGB signals are obtained that are able to reproduce colors with fidelity, particularly regarding hue, which is based on the calorimetric signals. Therefore, an object image having colors quite close to the original object colors can be displayed on the monitor 30.

As described above, according to the first embodiment, a color adjusting process can be carried out which takes the characteristics of the human visual sensation into consideration, that is, considering the difference of hue as important for sensing the color difference. The color space transformation matrix M is obtained as a product of the two matrices, the hue-optimizing matrix M_hue and the saturation-optimizing matrix M_sat, where each of the matrices is obtained by separate multiple linear regression analysis. Namely, both the hue-optimizing matrix M_hue and the saturation-optimizing matrix M_sat optimize hue and saturation in relation to the goal color $C_{me}$. Thereby, priority can be given to adjusting the hue of the corrected color $C_{es}$ to the goal color $C_{me}$, so that the color reproduction of an object image on the monitor 30 is improved.

In the above-described multiple linear regression analysis, differences of the hue angle between a corrected color $C_{es}$ and a goal color $C_{me}$ are distributed uniformly for each of the colors, however, when the hue coincidence of particular colors needs to be improved, such as human skin color, the set of criterion variables, such as the hue optimizing goal color $C_{me}'(1)$-$C_{me}'(18)$ and the goal colors $C_{me}(1)$-$C_{me}(18)$ may be weighted before carrying out the multiple linear regression analysis in steps S120 and S140. Namely, in this case, the multiple linear regression analysis is carried out by setting criterion variables as products of weights W(i), which are given to each of the eighteen colors, and the hue optimizing goal colors $C_{me}'(i)$, or products of weights W(i) and the goal colors $C_{me}$. Eq. (15) is a formula used when the multiple linear regression analysis is carried out while weighting the hue optimizing goal colors $C_{me}'(1)$-$C_{me}'(18)$ to generate the desired hue, and Eq. (16) is a formula used when the multiple linear regression analysis is carried out while weighting the goal colors $C_{me}(1)$-$C_{me}(18)$ to generate the desired saturation.

$$W \cdot B_{me}' = M\_hue \cdot B_{in} \qquad (15)$$

$$W \cdot B_{me} = M\_sat \cdot B_{es} \qquad (16)$$

where, W denotes a matrix with the elements corresponding to the weight W(i) for the eighteen colors, and the sum of the weights W(1)-W(18) is 1. With this weighting, the color reproduction for a particular color is improved as the weighting for the particular color is enhanced.

Next, a second embodiment of the present invention will be explained. In the second embodiment, the calculation of the color space transformation matrix is different from that of the first embodiment.

Figure 5:
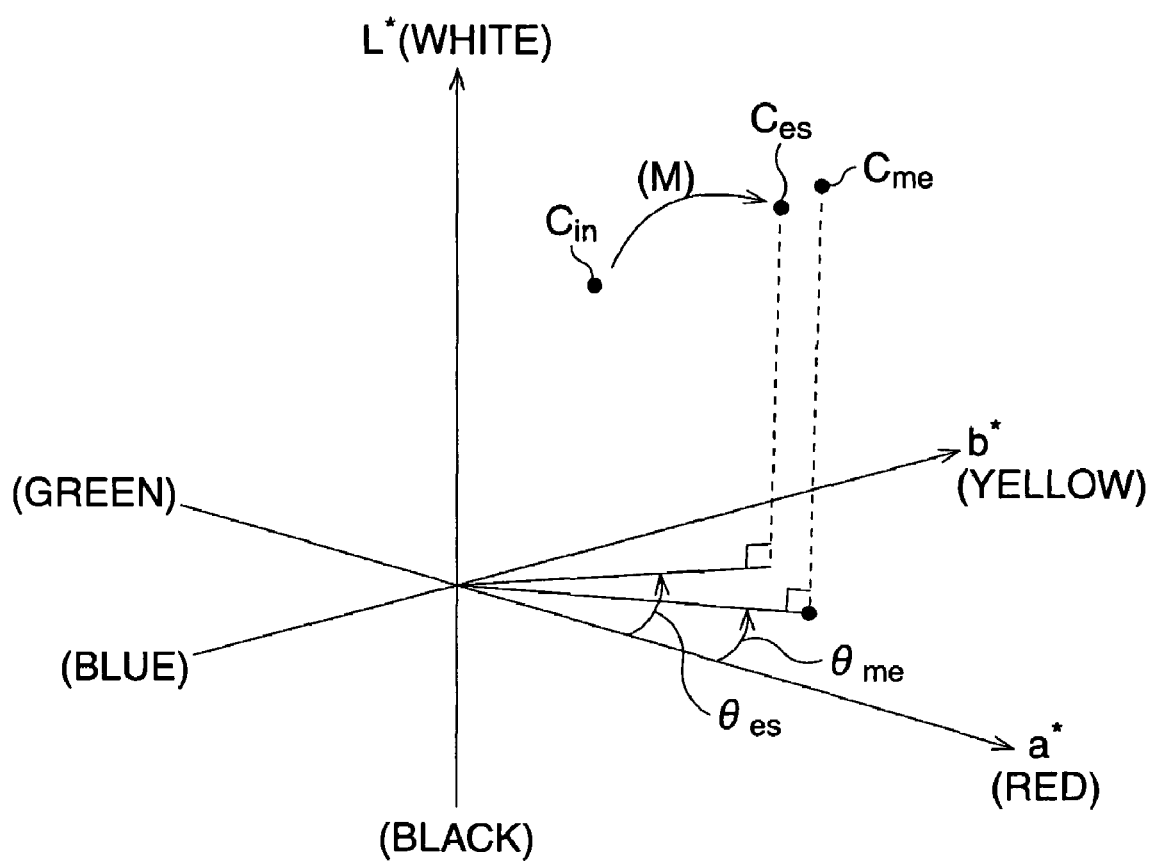
FIG. 5 illustrates the L*a*b* color space with the light source illuminating a standard light of CIE-$D_{65}$ for the second embodiment.
Figure 6:
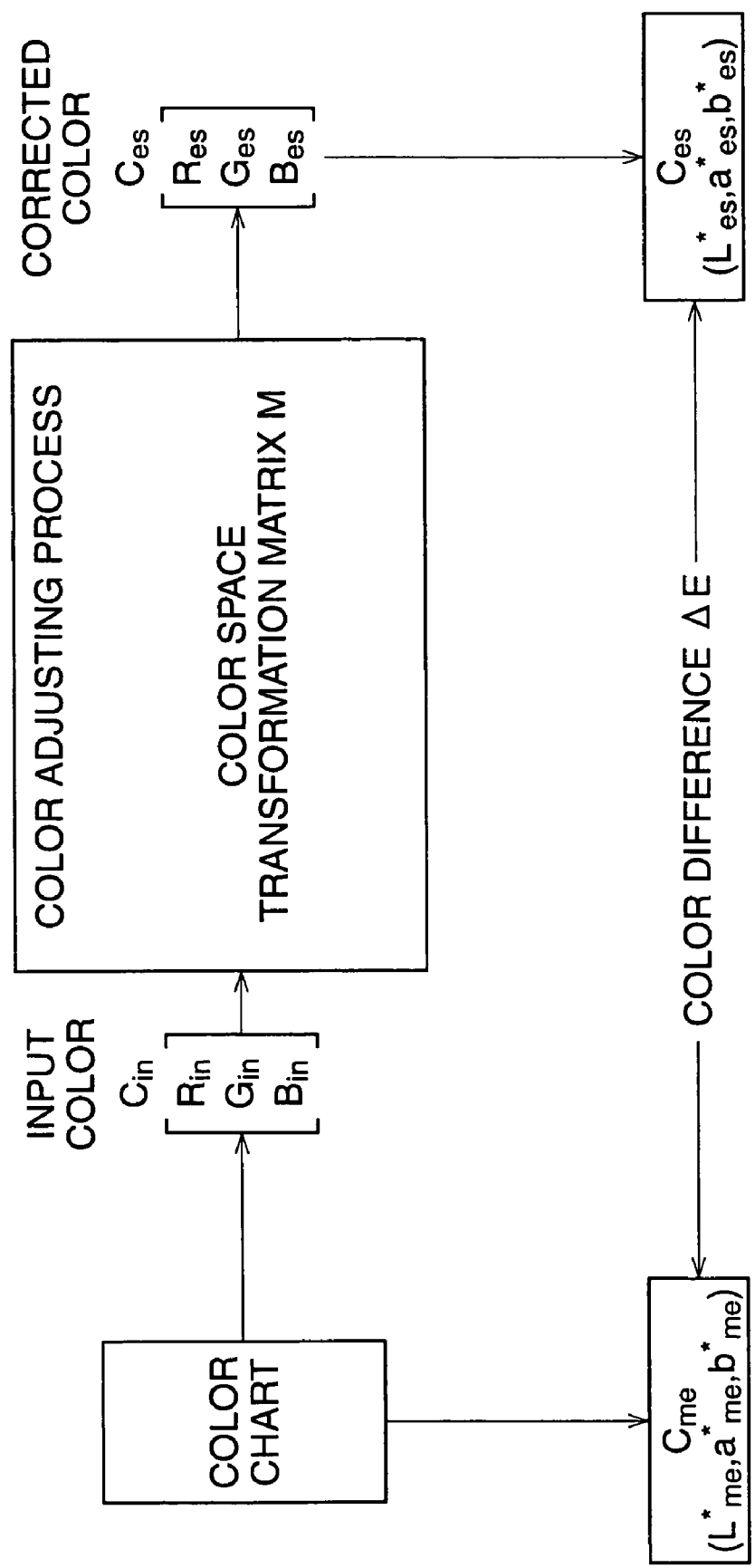
FIG. 6 is a block diagram schematically showing the processes that are carried out in the color space transformation matrix calculating process and the relations between each of the color signals.

With reference to FIG. 5 and FIG. 6, the calculation of the color space transformation matrix in the second embodiment will be explained. In FIG. 5, the Lab color space, with a light source illuminating the standard light of $CIE-D_{65}$, which represents day light at a 6504 K color. temperature, is depicted. A color that corresponds to an input color $C_{in}$, a predicted or corrected color $C_{es}$ which is obtained by the input color $C_{in}$ and the color space transformation matrix M, and a goal color $C_{me}$, to which the input color should be adjusted, are indicated as respective points in this Lab color space. Note that, in FIG. 5, the distances between each of the three points are emphasized for convenience of explanation. The L*a*b* signals of the goal color $C_{me}$ are preset to the values that are obtained by the colorimetric measurement. Further, FIG. 6 is a block diagram schematically showing the processes being carried out in the color space transformation matrix calculating process and the relations between each of the color signals.

In the first embodiment, the multiple linear regression analysis is used to optimize the color space transformation matrix M. However, in the second embodiment, the elements $m_1$-$m_9$ of the color space transformation matrix M are optimized by using the damped least square method. Namely, the color space transformation matrix M is derived as the sum square of the color differences ΔE between the corrected color $C_{es}$ and the goal color $C_{me}$ for all of the eighteen colors not to go over the permissible error. The corrected colors $C_{es}$ obtained by using the optimized color space transformation matrix M for each of the input colors $C_{in}$ approximately coincide with the goal color $C_{me}$.

The color difference between the corrected color $C_{es}$ and the goal color $C_{me}$ for one color is denoted by Eq. (17) and it is evaluated in the Lab space. In Eq. (17), L*a*b* signals of a corrected color $C_{es}$ are denoted by (L*$_{es}$, a*$_{es}$, b*$_{es}$) and of a goal color $C_{me}$ by (L*$_{me}$, a*$_{me}$, b*$_{me}$).

$$\Delta E = \{(\Delta L^*)^2 + (\Delta a^*)^2 + (\Delta b^*)^2\}^{1/2} \qquad (17)$$

where, $\Delta L^* = L^*_{me} - L^*_{es}$, $\Delta a^* = a^*_{me} - a^*_{es}$, $\Delta b^* = b^*_{me} - b^*_{es}$.

Hereinafter, to discriminate each of the color differences corresponding to the eighteen colors, the color differences will be indexed by the numbers of the color patches, for example $\Delta E_1, \Delta E_2, \ldots, \Delta E_{18}$. When denoting the color patch number by a parameter "i", each of the color differences is represented by $\Delta E_i$. Further, the matrix elements $m_1, m_2, \ldots, m_9$ will be denoted by the index parameter "j" (j=1, 2, . . . , 9) for example $m_j$. Since the corrected color $C_{es}$ is obtained by using the color space transformation matrix M on the input color $C_{in}$, as described in Eqs. (1) and (2), the color difference ΔE can be considered as a function $\Delta E_i(m_j)$ which includes the matrix elements $m_j$ as parameters.

In the damped least square method, the sum square of $\Delta E_i$ (i=1, 2, . . . , 18) obtained for each of the eighteen colors is defined as a merit function φ (see Eq. (18)). The matrix elements $m_j$ (j=1, 2, . . . , 9) are optimized in order to make the value of the merit function φ below or equal to a predetermined threshold value. The conditions under which the merit function φ is minimized are given by nine equations which are represented by Eq. (19). However, Eq. (18) is nonlinear so that the matrix elements $m_j$ can not be solved analytically. Therefore, the color differences $\Delta E_i$ are linearized about the starting point $m_{j0}$. When substituting the linearized color differences $\Delta E_i$, the merit function φ is expressed by a quadratic expression of $m_j$. Thus, substituting this quadratic formula into Eq. (19), the extreme value of the merit function φ satisfies the linear equation with nine unknowns. By solving this linear equation, approximate solutions for the matrix elements $m_j$ are obtained.

$$\phi = \sum_{i=1}^{18} (\Delta E_i)^2 \qquad (18)$$

$$\frac{\partial \phi}{\partial m_j} = 0 \quad (j = 1, 2, \ldots 9) \qquad (19)$$

The above linear equation is called a normal equation of the least square method. By deforming this normal equation to obtain displacement $\Delta m_j$, from the starting point $m_{j0}$ toward the solution, it is expressed as Eq. (20), as in the matrix form. The Δm denotes a column vector, where the elements $\Delta m_1, \Delta m_2, \ldots, \Delta m_9$ represent displacement from the starting point $m_{10}$-$m_{90}$ toward the solution for each $m_j$. The ΔE denotes a column vector, where the elements $\Delta E_1, \Delta E_2, \ldots, \Delta E_{18}$ represent the color differences, and A denotes a Jacobian matrix at the starting point $m_{j0}$. Therefore, the column vector Δm, the displacement $\Delta m_1, \Delta m_2, \ldots, \Delta m_9$ toward the solution, is immediately obtained by using the column vector ΔE and the Jacobian matrix A under Eq. (20).

$$\Delta m = -(A^t \cdot A)^{-1} \cdot A^t \Delta E \qquad (20)$$

where, $$\Delta m = \begin{pmatrix} \Delta m_1 \\ \Delta m_2 \\ \vdots \\ \Delta m_9 \end{pmatrix} \Delta E = \begin{pmatrix} \Delta E_1 \\ \Delta E_2 \\ \vdots \\ \Delta E_9 \end{pmatrix} A = \begin{pmatrix} a_{1\_1} & a_{1\_2} & \cdots & a_{1\_9} \\ a_{2\_1} & \cdots & \cdots & a_{2\_9} \\ \vdots & \vdots & \vdots & \vdots \\ a_{18\_1} & \cdots & \cdots & a_{18\_9} \end{pmatrix} a_{i\_j} = \frac{\partial \Delta E_i}{\partial m_j}\bigg|_{m_j = m_{jo}}$$

Therefore, approximate solutions for the matrix elements $m_1$-$m_9$ are obtained by adding the displacement $\Delta m_1, \Delta m_2, \ldots, \Delta m_9$ (obtained from Eq. (20) by substituting given initial values to the starting point $m_{10}$-$m_{90}$. Further, the approximate solution obtained by the above process then becomes a new starting point $m_{j0}$ and a new approximate solution for the matrix elements $m_1$-$m_9$ is again obtained. This operation is repeated until the merit function $\phi$ yields a value below or equal to the threshold value. When the value of the merit function reaches a point below or equal to the threshold value, the approximate values at that time are determined to have converged to a solution of the matrix elements $m_1$-$m_9$ and are set as the elements.

Note that, the merit function $\phi$ is not restricted to Eq. (18). For example, as shown in Eq. (21), a function wherein a term of the sum square of $\Delta m_j$ multiplied by a damping factor D (>0), is added to the sum square of the color differences $\Delta E_i$, may be adopted for the merit function $\phi$, in order to secure the convergence of the solution, and for efficiency. As the value of the damping factor D increases, the approximation error decreases, but the speed of convergence is reduced. The method using the damping factor D is well known in the art, so it is not detailed here. In the present embodiment, the damping factor D is set to a predetermined value. However, the value of the damping factor D may be altered during the iteration process for obtaining the approximate solution. In this case, the normal equation is expressed as Eq. (22).

$$\phi = \sum_{i=1}^{18} \Delta E_i^2 + D \sum_{j=1}^{9} \Delta m_j^2 \quad (21)$$

$$\Delta m = -(A^t \cdot A + D \cdot I)^{-1} \cdot A^t \cdot \Delta E \quad (22)$$

where, "I" in Eq. (22) denotes a unit matrix.

In the above-described optimization of the matrix, the difference between the corrected color $C_{es}$ and the goal color $C_{me}$ is merely evaluated by the color difference $\Delta E$ in the Lab space. However, the difference $\Delta\theta$ (see Eq. (23)) between the hue angles $\theta_{es}$ and $\theta_{me}$ of the above corrected and goal colors may be incorporated into the evaluation in order to give priority to the hue coincidence, since human eyes are sensitive to a difference in hue rather than saturation. An equation in which the sum of the squares of the hue angle differences $\Delta\theta$ is added to the first term of right-hand side of Eq. (21) is expressed as Eq. (24). Note that, the hue angle differences $\Delta\theta$ are small compared to the color difference $\Delta E$, so that the hue angle differences $\Delta\theta$ in Eq. (24) may be weighted to improve the coincidence of hue.

$$\Delta\theta = \theta_{me} - \theta_{es} = \tan^{-1}\left(\frac{b^*_{me}}{a^*_{me}}\right) - \tan^{-1}\left(\frac{b^*_{es}}{a^*_{es}}\right) \quad (23)$$

$$\phi = \sum_{i=1}^{18} \{(\Delta E_i)^2 + (\Delta\theta_i)^2\} + D \sum_{j=1}^{9} \Delta m_j^2 \quad (24)$$

Furthermore, the color differences between the corrected colors $C_{es}$ and the goal colors $C_{me}$ for each of the colors are distributed uniformly in the matrix optimization process using the merit function $\phi$, which is defined by one of Eq. (18), (21), and (24). However, when it is necessary to improve the hue coincidence of particular colors, such as human skin color, the color differences $\Delta E_i$ may be weighted by the weights $W_i$ (i=1, 2, . . . , 18), which are given to each of the eighteen colors. The sum of the weights $W_1$-$W_{18}$ is 1. The merit function, when the weights $W_i$ are applied to the merit function $\phi$ of Eq. (21) is expressed by Eq. (25). With this weighting, the color reproduction for a particular color is improved since the weighting for the particular color is enhanced.

$$\phi = \sum_{i=1}^{18} (W_i \cdot \Delta E_i)^2 + D \sum_{j=1}^{9} \Delta m_j^2 \quad (25)$$

When the initial values for the starting point $m_{10}, m_{20}, \ldots, m_{90}$ are properly given in the calculation of the optimization, the number of iterations is reduced and thus the computing time is shortened. Therefore, it is preferable to preset the initial values as close to the solution as possible. In the present embodiment, the initial values of the starting point $m_{10}, m_{20}, \ldots, m_{90}$ are initially preset to 1, 0, 0, 0, 1, 0, 0, 0, and 1, respectively, since input color $C_{in}$ and the goal color $C_{es}$ are assumed to be the same. Namely, the initial color space transformation matrix M is primarily given as the unit matrix. Further, in the present embodiment, eight initial values are fixed and the remaining one element is solely varied little by little in minute steps (e.g. 0.01) from the value "1" or "0", within a predetermined range (e.g. ±0.3), so that a plurality of initial starting points are given. Further the optimization is carried out for each of the initial starting points and provides a plurality of solutions corresponding to each of the initial values. The optimum solution for an object is selected from those solutions. Conventionally, the initial values are selected based on the experiment of a designer or by referring to data. However, according to the initial value setting procedure of the present embodiment, even a user who is not well skilled in the art can easily obtain an optimum solution.

Figure 7A:
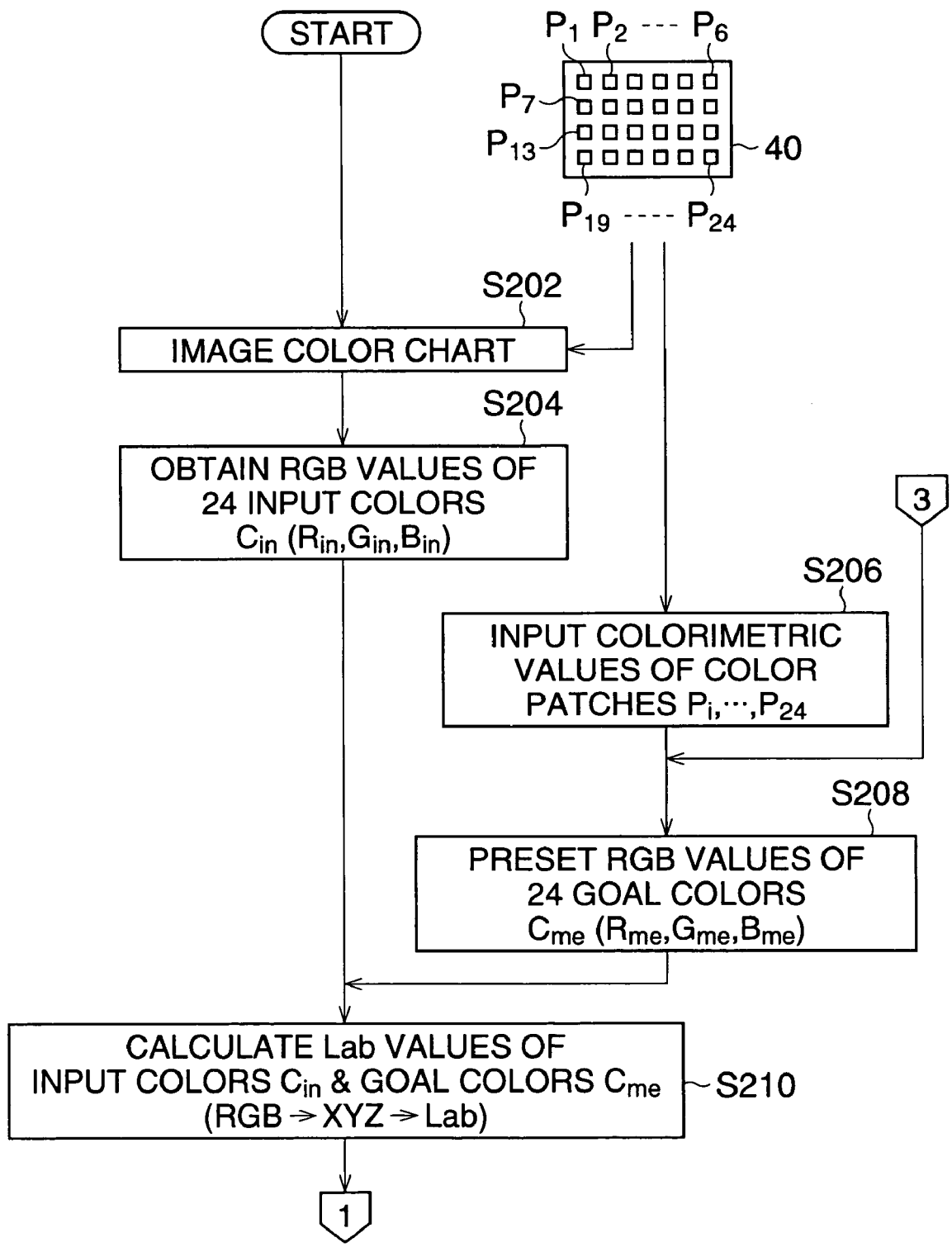
FIGS. 7A-7C are flow charts of the color space transformation calculating processes for the second embodiment.
Figure 7B:
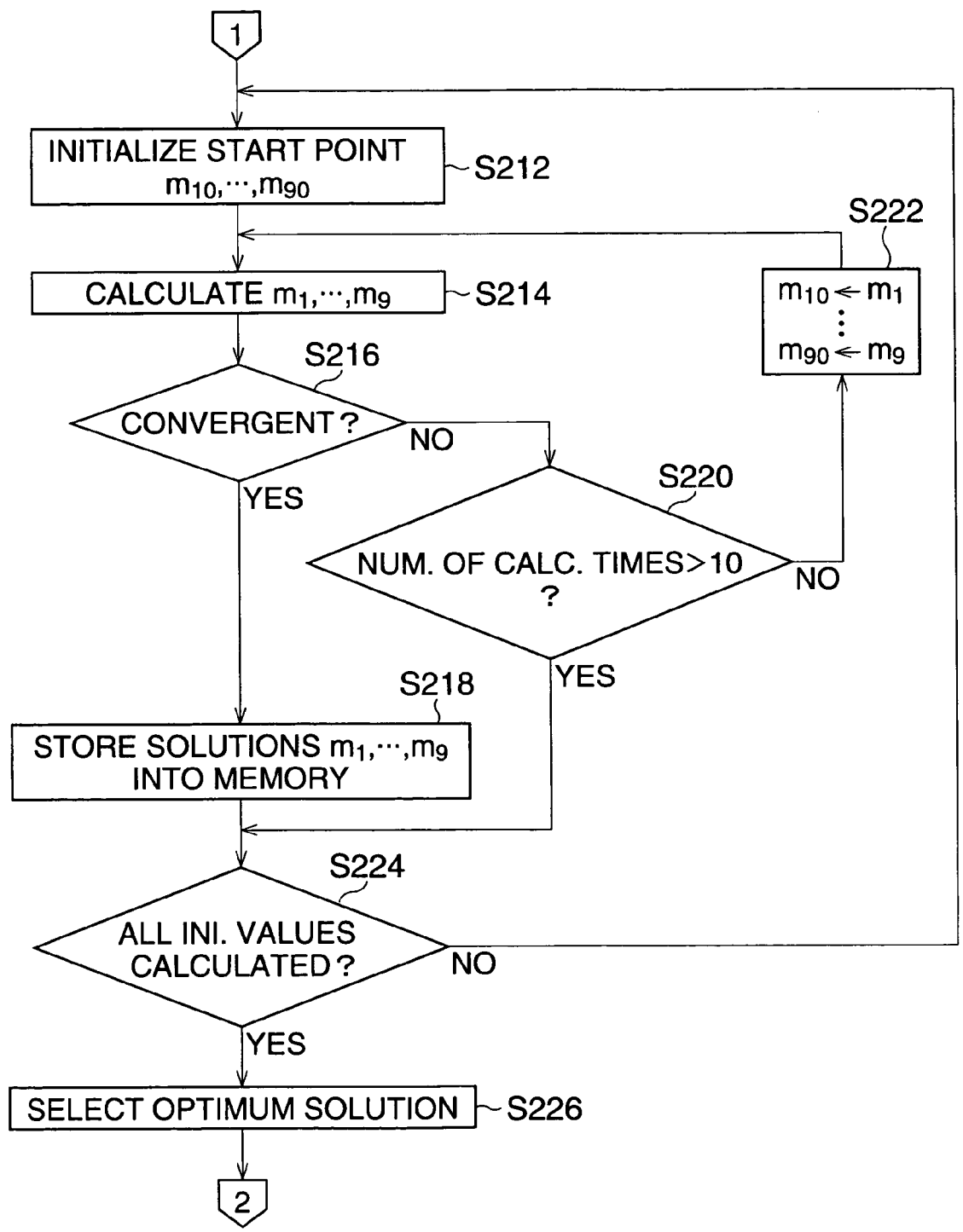
Figure 7C:
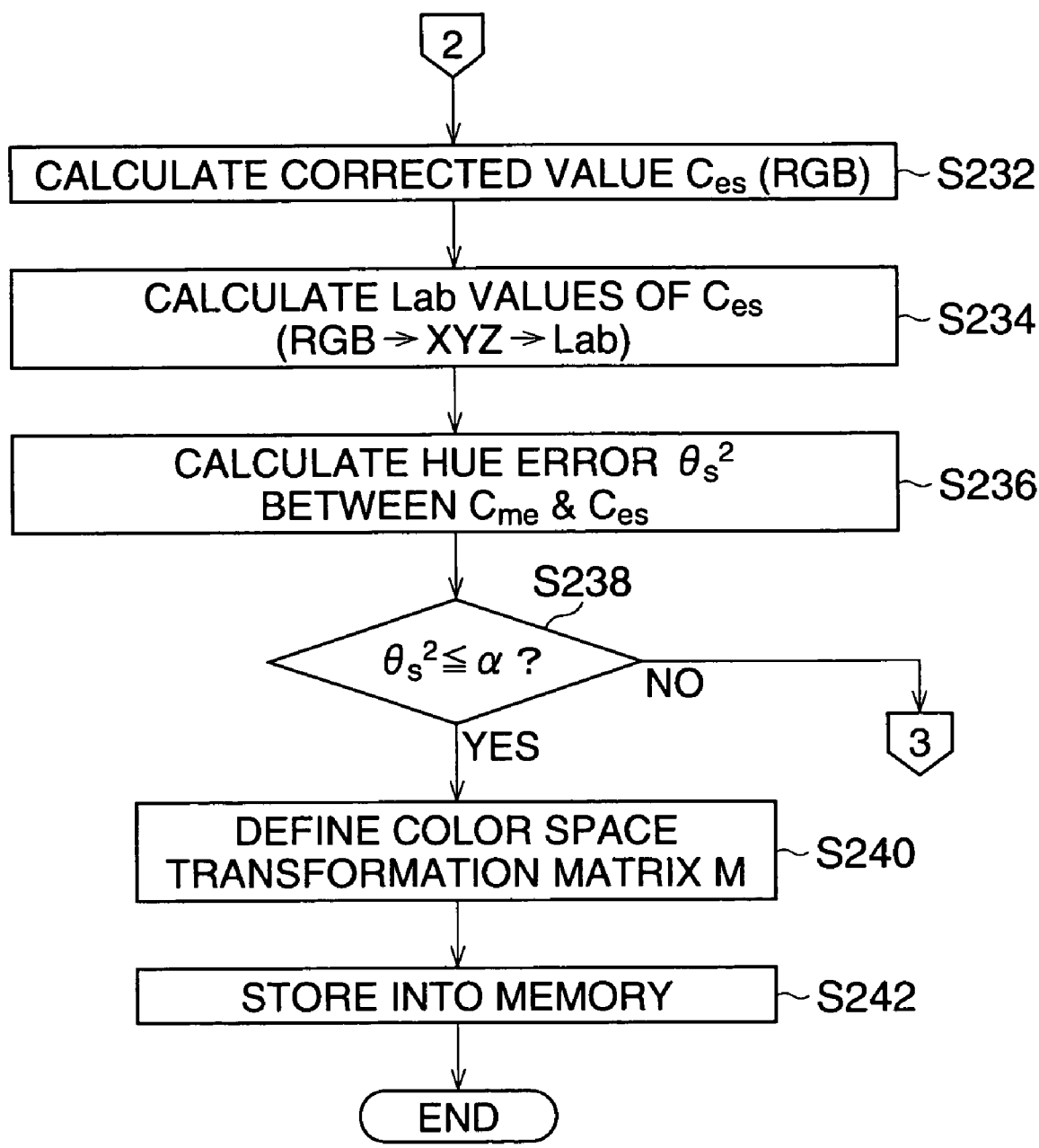

With reference to the flow charts of FIGS. 7A to 7C, the color space transformation calculating process for the second embodiment is explained in detail.

The processes in steps S202-S210 are the same as those in steps S102-S110 of the first embodiment (see FIG. 4A), so that the description for these steps is omitted. When the process of step S210 is complete, the operations specific to the second embodiment are performed. Namely, at step S210, the L*a*b* signals for each of the eighteen input color $C_{in}(i)$ (i=1, 2, . . . , 18), which are obtained at step S204, are derived and are denoted by (L*$_{in}$(i), a*$_{in}$(i), b*$_{in}$(i)). Further, the L*a*b* signals for each of the eighteen goal colors $C_{em}(i)$ (i=1, 2, . . . , 18), which are obtained at step S208, are derived and denoted by (L*$_{me}$(i), a*$_{me}$(i), b*$_{me}$(i))

From step S212 through step S226, the damped least square method is carried out and nine matrix elements $m_1, m_2, \ldots, m_9$ for the color space transformation matrix M are obtained. In step S212, the initial values of the starting point $m_{10}, m_{20}, \ldots, m_{90}$ are preset as 1, 0, 0, 0, 1, 0, 0, 0, 1, by assuming the input color $C_{in}$ and the goal color $C_{es}$ to be the same.

Further in step S214, the displacement $\Delta m_1$-$\Delta m_9$ from the starting point toward the solution is obtained from the normal equation (20) of the above-mentioned least square method, and added to the starting point $m_{10}$-$m_{20}$ in order to obtain approximate solution for the matrix elements $m_1$-$m_9$. In step S216, whether the approximate solution is sufficiently close or substantially equal to the real solution is determined. Namely, whether the sum square of the color differences $\Delta E_1$-$\Delta E_{18}$, in the Lab space, between the goal colors $C_{me}(1)$-$C_{me}(18)$ and the corrected colors $C_{es}(1)$-$C_{es}(18)$ are within the permissible error ranges, is determined. Here, the corrected colors $C_{es}(1)$-$C_{es}(18)$ are obtained by using the color space transformation matrix M for the input colors $C_{in}(1)$-$C_{in}$ (18), where the elements of the matrix are given by the predicted or approximate solution. When it is determined that the predicted solution has converged or is close enough to the real solution, the predicted solution is provisionally stored in the memory (not shown) of the matrix generator 34 (step 218) and the process proceeds to step S224. When it is determined, in step S216, that the predicted solution has not converged, whether the calculation in step S214 has been iterated more than ten times is further determined in step S220. When the iteration has not reached ten times, the values of the starting point $m_{10}$-$m_{90}$ are altered by the current solutions (the sum of the initial values of $m_{10}$-$m_{90}$ and the displacement $\Delta m_1$-$\Delta m_9$) in step S222, and the process returns to step S214. When the iteration of the calculation in step S214 has exceeded ten times, the process proceeds to step S224 from step S220.

In short, in steps S212-S222, the approximate solution of the matrix elements $m_1$-$m_9$ is predicted by assuming the initial values of the starting point $m_{10}$-$m_{90}$ as 1, 0, 0, 0, 1, 0, 0, 0, 1, and then the matrix elements $m_1$-$m_9$ are renewed using the predicted solution, as a new starting point $m_{10}$-$m_{90}$, and these processes are repeated until the color difference value is evaluated to be below or equal to the permissible error level. However, when the calculation does not converge although the calculation has been repeated more than ten times, this optimizing process is terminated. Note that, in the present embodiment, the number of times necessary for iteration to achieve the convergence is predicted to be about four or five times, thus the limit for iterations is preset to ten times. However, the number of times for the iteration is not restricted to that in the present embodiment, and it may be changed in accordance with the performance of the matrix generator.

The solution that is obtained by optimizing the calculation of steps S214-S222 is dependent on the initial values of the starting points $m_{10}$-$m_{90}$, which are given at step 212, so that solution is generally changed when the initial values are altered. Therefore, in the present embodiment, eight elements are fixed for the initial values "1" and "0". On the other hand, the remaining one element is varied from the primarily given initial value within a predetermined range (±0.3) in steps of 0.01, and 270 (30×9) sets of initial values are given. In turn, the solutions for each set of initial values are calculated. In step S224, whether the optimizing process for every set of initial values has been completed, is determined. When it is not completed, the process returns to step S212 and a set of initial values that have not been used for the calculation are preset as new initial values and the optimizing calculation is again carried out. When it is determined that the optimizing process has been carried out for all sets of initial values, the process proceeds to step S226. At this time, a plurality of solutions for the matrix elements $m_1$-$m_9$ that satisfy the condition that the sum of the squares of the color differences $\Delta E_1$-$\Delta E_{18}$ for all eighteen colors is below or equal to permissible error, is stored in the memory.

In step S226, the optimum solution is selected from the plurality of solutions for the matrix elements $m_1$-$m_9$. Namely, a solution that gives the minimum sum of the squares of the hue angle differences $\Delta\theta_1$-$\Delta\theta_{18}$ between the corrected colors $C_{es}(1)$-$C_{es}(18)$ and the goal colors $C_{me}(1)$-$C_{me}(18)$, is selected, so that the corrected colors $C_{es}(1)$-$C_{es}(18)$ are obtained by using the color space transformation matrix in which a solution of the matrix elements is preset. Therefore, the matrix elements $m_1$-$m_9$, obtained in step S226, give the sum of the squares of the color difference $\Delta E_1$-$\Delta E_{18}$, for each of the eighteen colors of the Macbeth color checker 40, which is below or equal to the permissible error, and minimize the sum square of the hue angle differences $\Delta\theta_1$-$\Delta\theta_{18}$.

Note that, the conditions for selecting the optimum solution are not restricted to the present embodiment, and can be altered as to requirements. For example, when it is necessary to give priority to a selected color, such as human skin color, a severe condition for the color difference between the corrected color $C_{es}$ and the goal color $C_{me}$ for the selected color, may be added.

In steps S232-242, the validity of the obtained color space transformation matrix M is evaluated. In step S232, the obtained solution is preset for the color space transformation matrix M, and then the RGB signals ($R_{es}(1)$, $G_{es}(1)$, $B_{es}(1)$-($R_{es}(18)$, $G_{es}(18)$, $B_{es}(18)$)) of the corrected colors $C_{es}(1)$-$C_{es}(18)$ are obtained by using the color space transformation matrix M for the input colors $C_{in}(1)$-$C_{in}(18)$, see Eqs. (1) and (2). Further, in step S234, the L*a*b* signals ($L^*_{es}(1)$, $a^*_{es}(1)$, $b^*_{es}(1)$)-($L^*_{es}(18)$, $a^*_{es}(18)$, $b^*_{es}(18)$)) of the corrected colors $C_{es}(1)$-$C_{es}(18)$ are obtained by using Eqs. (3) and (4) via the XYZ signals.

Further, in step S236, the hue angle differences $\Delta\theta_1$ to $\Delta\theta_{18}$ are calculated by Eq. (23), based on the L*a*b* signals ($L^*_{es}(1)$, $a^*_{es}(1)$, $b^*_{es}(1)$)-($L^*_{es}(18)$, $a^*_{es}(18)$, $b^*_{es}(18)$) of the corrected colors $C_{es}(1)$-$C_{es}(18)$ that have been calculated in step S234 and the L*a*b* signals ($L^*_{me}(1)$, $a^*_{me}(1)$, $b^*_{me}(1)$)-($L^*_{me}(18)$, $a^*_{me}(18)$, $b^*_{me}(18)$) of the goal colors $C_{me}(1)$-$C_{me}(18)$ that have been calculated in step S210. In turn, the hue error $\theta s^2$, which is the sum of the squares of the hue angle differences $\Delta\theta_1$ to $\Delta\theta_{18}$, is obtained by Eq. (26).

$$\theta_s^2 = \sum_{i=1}^{18} (\Delta\theta_i)^2 \tag{26}$$

In step S238, whether the hue error $\theta s^2$ is below or equal to a permissible value $\alpha$ is determined. When the hue error $\theta s^2$ is above the permissible value $\alpha$, the process returns to step S208 and at least one of the goal colors $C_{me}(1)$-$C_{me}(18)$ is replaced, and further a new color space transformation matrix M is calculated. Note that, when returning to step S208 and when the RGB signals of the goal colors $C_{me}(1)$-$C_{me}(18)$ are altered, each of the values should be determined under the condition of making only a small change in hue, so as not to change the tint of a reproduced color on the monitor 30 from the original color of the object.

When it is determined, in step S238, that the hue error $\theta s^2$ is below or equal to the permissible value $\alpha$, the color space transformation matrix M is determined as a matrix that transforms the input colors $C_{in}$ to values which precisely approximate the goal colors $C_{me}$ with respect to hue. Accordingly, in step S240, the current matrix elements of the color space transformation matrix M are determined as the solution, and then, in step S242, the matrix elements of the color space transformation matrix M are transmitted from the matrix generator 34 to the digital still camera 10 and are stored in the memory 22.

Accordingly, when using the above-obtained color space transformation matrix M for a color adjusting process of the digital still camera 10, sRGB signals based on the colorimetric signals are obtained with fidelity. Therefore, an object image having colors quite close to the original object colors can be displayed on the monitor 30.

As described above, in the second embodiment, the color space transformation matrix, which is used to correct color, is obtained by means of the damped least square method. In this damped least square method, the evaluation of the color difference and hue in the Lab space can be incorporated into the merit function φ, refer to Eqs. (18), (21), (24), and (25). The RGB signals are easily transformed to the color signals in the uniform color space (e.g. L*a*b* color space), and conditions (such as making coincidence in color or hue) in the L*a*b* color space or uniform color space can be easily given. Further, the color differences $\Delta E_i$ are linearized in the damped least square method, so that the optimizing calculations are simplified and calculation time is made short. The transformation from the RGB color space to the L*a*b* color space is significantly complicated, since it includes multiple calculations. However, when using the damped least square method, the calculation time is reduced, since it is not necessary to retransform the L*a*b* signals into RGB signals. This is because there is no need to compensate the color space transformation matrix based on the evaluation of coincidence between the corrected colors $C_{es}$ and the goal colors $C_{me}$, which is not carried out in the L*a*b* color space.

Note that, the image input device is not restricted to the digital still camera 10 of the present embodiments, but it can also be any type of device, such as digital video camera, scanner, electronic endoscope, and the like. Further, in the present embodiments, the matrix generator 34 is configured as an external device to the digital still camera 10, however the matrix generating function may be incorporated into the digital still camera 10. Furthermore, it may be configured as an image processing software application that is able to calculate the color space transformation matrix and is able to correct colors, so that the software may be installed in a personal computer system and the RAW data from the digital still camera 10 are subjected to the color correction processes in the personal computer system.

In the present embodiments, the color space transformation matrix that adjusts colors of RGB signals obtained by the imaging system is based on the sRGB standard. However, the matrix calculating methods in the present embodiments are not restricted to the calculation of a matrix that is specific to this type of color correction. For example, a color space transformation matrix that interactively transforms color signals between different color spaces, such as a transformation of RGB signals to XYZ signals or to CMYK signals for printing, and a transformation of CMY signals for complementary colors to RGB signals, may be calculated by the above-discussed method.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications Nos. 2003-201668 and 2003-201792 (both filed on Jul.25, 2003), which are expressly incorporated herein, by reference, in their entirety.

The invention claimed is:

1. A color space transformation matrix calculating system that optimizes a color space transformation matrix which transforms colors in a first color space to colors in a second color space, comprising:
a first optimizer that calculates elements of a first matrix by multiple linear regression analysis, where input colors in said first color space, which correspond to a plurality of color patches, are set as first explanatory variables, first goal colors that relate to hue in a second color space and which correspond to said plurality of color patches are set as first criterion variables, and said elements of said first matrix are set as partial regression coefficients, and where, saturation and hue values for each of said color patches differ slightly from each other; and
a second optimizer that calculates elements of a second matrix by multiple linear regression analysis, where hue corrected colors calculated using said first matrix and said input colors in said first color space are set as second explanatory variables, second goal colors that relate to saturation in a second color space and which correspond to said plurality of color patches are set as second criterion variables, and said elements of said second matrix are set as partial regression coefficients;
wherein said color space transformation matrix is a product of said first and second matrices.

2. A system according to claim 1, wherein said input colors in said first color space, said hue corrected colors, and said first and second goal colors are transformed to colors in a uniform color space of CIE-L*a*b*, when evaluating the coincidence of the colors.

3. A system according to claim 1, wherein said second goal colors comprise colorimetric colors, and said first goal colors are determined as colors that correspond to points where said input colors are orthogonally projected onto each of the lines connecting the origin and said second goal colors in said CIE-L*a*b*.

4. A system according to claim 1, wherein said color patches comprise eighteen chromatic color patches of the Macbeth color checker chart.

5. A system according to claim 4, wherein input colors of said first color space that correspond to said eighteen chromatic color patches, are subjected to a white balance adjusting process based on input colors of said first color space that correspond to six achromatic color patches of said Macbeth color checker chart.

6. A system according to claim 1, wherein said first color space comprises an RGB color space and said second color space comprises an sRGB color space, and where said input colors are obtained by an imaging device provided with a color filter.

7. A method for calculating and optimizing a color space transformation matrix that transforms colors in a first color space to colors in a second color space, comprising:
optimizing elements of a first matrix by using multiple linear regression analysis, where input colors in said first color space, which correspond to a plurality of color patches, are set as first explanatory variables, first goal colors that relate to hue in a second color space and which correspond to said plurality of color patches, are set as first criterion variables, and said elements of said first matrix are set as partial regression coefficients, and where saturation and hue for each of said color patches differ slightly from each other;
optimizing elements of a second matrix by using multiple linear regression analysis, where hue corrected colors calculated using said first matrix and said input colors in said first color space, are set as second explanatory variables, second goal colors that relate to saturation in a second color space and which correspond to said plurality of color patches, are set as second criterion variables, and said elements of said second matrix are set as partial regression coefficients; and
multiplying said first matrix by said second matrix, so that said color space transformation matrix is obtained.

* * * * *